(12) United States Patent
Howarth et al.

(10) Patent No.: US 12,466,861 B2
(45) Date of Patent: Nov. 11, 2025

(54) POLYPEPTIDE WITH ENHANCED RATE OF SPONTANEOUS ISOPEPTIDE BOND FORMATION WITH ITS PEPTIDE TAG PARTNER AND USES THEREOF

(71) Applicant: Oxford University Innovation Limited, Oxford (GB)

(72) Inventors: Mark Howarth, Oxford (GB); Anthony Keeble, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 1019 days.

(21) Appl. No.: 17/435,742

(22) PCT Filed: Mar. 13, 2020

(86) PCT No.: PCT/GB2020/050652
§ 371 (c)(1),
(2) Date: Sep. 2, 2021

(87) PCT Pub. No.: WO2020/183198
PCT Pub. Date: Sep. 17, 2020

(65) Prior Publication Data
US 2022/0135628 A1    May 5, 2022

(30) Foreign Application Priority Data

Mar. 14, 2019    (GB) ..................................... 1903479

(51) Int. Cl.
*C07K 14/315* (2006.01)
*C12N 15/70* (2006.01)

(52) U.S. Cl.
CPC ............ *C07K 14/315* (2013.01); *C12N 15/70* (2013.01)

(58) Field of Classification Search
CPC ............................. C07K 14/315; C12N 15/70
See application file for complete search history.

(56) References Cited

U.S. PATENT DOCUMENTS

2022/0041663 A1*  2/2022  Howarth ................. C07K 1/14

FOREIGN PATENT DOCUMENTS

| CN | 107708720 A | 2/2018 |
| CN | 108715846 A | 10/2018 |
| WO | 2011/098772 A1 | 8/2011 |
| WO | 2016/112921 A1 | 7/2016 |
| WO | 2016/193746 A1 | 12/2016 |
| WO | 2018093274 A1 | 5/2018 |
| WO | 2018/197854 A1 | 11/2018 |
| WO | 2019/006046 A2 | 1/2019 |

OTHER PUBLICATIONS

Jaffe (Molecular microbiology 21.2 (1996): 373-384) (Year: 1996).*
Chinese Office Action for Patent Application No. 2020800331690, dated Sep. 25, 2023, pp. 1-13 (Translation Included).
Alves NJ et al, ACS Appl Mater Interfaces. Nov. 11, 2015;7(44):24963-72.
Alves NJ et al, Sci Rep. Apr. 27, 2016;6:24866.
Alves NJ et al, J Vis Exp. Nov. 16, 2016;(117).
Banerjee and Howarth, 2018, Curr Opin Biotechnol. 51, 16-23.
Bedbrook CN et al, Chem Biol. Aug. 20, 2015;22(8):1108-21.
Botyanszki et al., 2015, Biotechnology and Bioengineering 112, 2016-2024.
Brune et al., 2016, Scientific Reports 6, 19234.
Chen et al., 2011, Proc Natl Acad Sci U S A 108, 11399-11404.
Chen AY et al, Nat Mater. May 2014;13(5):515-23.
Dorval Courchesne et al, ACS Biomater. Sci. Eng. 2017, 3, 5, 733-741.
Dovala D et al, Protein Expr Purif. Jan. 2016;117:44-51.
Fairhead M et al, Journal of the American Chemical Society Sep. 3, 2014;136(35):12355-63.
Fierer JO et al, Proc Natl Acad Sci U S A. Apr. 1, 2014;111(13):E1176-81.
Fuller CW et al, Proc Natl Acad Sci U S A. May 10, 2016;113(19):5233-8.
Gao X et al, Biomacromolecules. Sep. 12, 2016;17(9):2812-9.
Giessen TW, Silver P., Chembiochem. Oct. 17, 2016;17(20):1931-1935.
Gilbert et al, ACS Synth. Biol. 2017, 6, 6, 957-967.
Jaffe et al., 1996 Mol. Microbiol. vol. 21(2), pp. 373-384.
Janitzek CM et al, Malar J. Nov. 8, 2016;15(1):545.
Akshmanan A et al, ACS Nano. Aug. 23, 2016;10(8):7314-22.
Leonard JD, Narlikar GJ., Mol Cell. Mar. 5, 2015;57(5):850-9.
Liu X et al, Sci Rep. Nov. 29, 2016;6:38019.
Liu Z et al, Oncoimmunology. Mar. 10, 2016;5(6):e1147641.
Liu Z et al, Sci Rep. Dec. 1, 2014;4:7266.
Min D et al, Protein Sci. Aug. 2016;25(8):1535-44.
Moon et al, Chem Commun (Camb). Nov. 29, 2016;52(97):14051-14054.
Nguyen PQ et al, Nat Commun. Sep. 17, 2014;5:4945.
Pardee K et al, Cell. Sep. 22, 2016;167(1):248-259.
Reddington and Howarth, Current Opinion in Chemical Biology (2015); 29, 94-99.
Schloss et al, ACS Biomater. Sci. Eng. 2016, 2, 11, 1856-1861.
Schmid-Burgk et al, Nat Commun. Jul. 28, 2016;7:12338.
Schoene et al., 2016, Scientific Reports 6, 21151.
Schoene C et al, Angewandte Chemie. Jun. 10, 2014;53(24):6101-4.
Si M et al, PLoS One. Sep. 22, 2016;11(9):e0162318.
Siegmund et al, Sci Rep. Dec. 16, 2016;6:39291.

(Continued)

*Primary Examiner* — Anne M. Gussow
*Assistant Examiner* — Kyle T Rega
(74) *Attorney, Agent, or Firm* — Thomas|Horstemeyer, LLP

(57) ABSTRACT

The present invention relates to a polypeptide that forms one part of a two-part linker in which the polypeptide spontaneously forms an isopeptide bond with a peptide tag, the second part of the two-part linker. Nucleic acid molecules encoding the polypeptide, vectors comprising said nucleic acid molecules, and host cells comprising said vectors and nucleic acid molecules are also provided. A kit comprising said two-part linker (i.e. peptide tag and polypeptide binding partner), and/or nucleic acid molecules/vectors is also provided. A method of producing the polypeptide (binding partner) and the uses of the polypeptide of the invention are also provided.

20 Claims, 7 Drawing Sheets

Specification includes a Sequence Listing.

(56) References Cited

OTHER PUBLICATIONS

Stranges et al, 2016, Proc Natl Acad Sci U S A 113, E6749-E6756.
Sun F et al, Proc Natl Acad Sci U S A. Aug. 5, 2014;111(31):11269-74.
Thrane et al., 2016, Journal of Nanobiotechnology 14, 30.
Veggiani et al., 2016 Proc Natl Acad Sci U S A 113, 1202-1207.
Walden M et al, Elife. Jun. 2, 2015;4.
Wang XW, Zhang WB., Angew Chem Int Ed Engl. Mar. 1, 2016;55(10):3442-6.
Xiong et al, Chinese Journal of Biochemistry and Molecular Biology (2016), 32 (10): 1141-1149.
Zakeri and Howarth, 2010, J. Am. Chem. Soc. vol. 132, pp. 4526-4527.
Zakeri et al., 2012, Proc Natl Acad Sci U S A 109, E690-697.
Zhang WB et al, J Am Chem Soc. Sep. 18, 2013;135(37):13988-97.
International Search Report and Written Opinion for WO 2020/183198 (PCT/GB2020/050652), dated Jun. 4, 2020, pp. 1-16.
UK Search Report for GB 1903479.2, dated Jul. 12, 2019, pp. 1-4.
Li Long et al: "Structural Analysis and Optimization of the Covalent Association between SpyCatcher and a Peptide Tag", Journal of Molecular Biology, Academic Press, United Kingdom, vol. 426, No. 2, Oct. 23, 2013 (Oct. 23, 2013), pp. 309-317.
Yang Cao et al: "Supercharging SpyCatcher toward an intrinsically disordered protein with stimuli-responsive chemical reactivity", Chemical Communications, vol. 53, No. 63, Jan. 1, 2017 (Jan. 1, 2017), pp. 8830-8833.
Anthony H Keeble et al: "Protein-Protein Interactions Evolving Accelerated Amidation by SpyTag/SpyCatcher to Analyze Membrane Dynamics", Angewandte Chemie, International Edition, vol. 56, No. 52, Dec. 22, 2017 (Dec. 22, 2017), pp. 16521-16525.
Japanese Office Action for Patent Application No. 2021-555259, dated Feb. 20, 2024, pp. 1-7 (Translation Only).

\* cited by examiner

A

B

C

POLYPEPTIDE WITH ENHANCED RATE OF SPONTANEOUS ISOPEPTIDE BOND FORMATION WITH ITS PEPTIDE TAG PARTNER AND USES THEREOF

The work leading to this invention has received funding from the European Research Council under the European Union's Seventh Framework Programme (FP7/2007-2013)/ERC grant agreement no 615945

CROSS-REFERENCE TO RELATED APPLICATIONS

This application is the National Stage of International Application No. PCT/GB2020/050652, filed Mar. 13, 2020, which claims priority to GB 1903479.2, filed Mar. 14, 2019, which are entirely incorporated herein by reference.

SEQUENCE LISTING

This application contains a sequence listing filed in electronic form as an ASCII.txt file entitled "Seq listing ST25.txt", having a size of 49 KB, dated Mar. 14, 2019. The content of the sequence listing is incorporated herein in its entirety.

The present invention relates to a polypeptide that forms one part of a two-part linker in which the polypeptide (protein) spontaneously forms an isopeptide bond with a peptide tag, the second part of the two-part linker. In particular, the two-part linker may be viewed as a peptide tag and polypeptide binding partner cognate pair that can be conjugated via a covalent bond when contacted under conditions that allow the spontaneous formation of an isopeptide bond between the polypeptide of the invention and the peptide tag. Nucleic acid molecules encoding the polypeptide, vectors comprising said nucleic acid molecules, and host cells comprising said vectors and nucleic acid molecules are also provided. A kit comprising said two-part linker (i.e. peptide tag and polypeptide binding partner), and/or nucleic acid molecules/vectors is also provided. A method of producing the polypeptide (binding partner) and the uses of the polypeptide of the invention are also provided.

Cellular function depends on enormous numbers of reversible non-covalent protein-protein interactions and the precise arrangement of proteins in complexes influences and determines their function. Thus, the ability to engineer covalent protein-protein interactions can bring a range of new opportunities for basic research, synthetic biology and biotechnology. In particular, the conjugation of two or more proteins to form a so-called "fusion protein" can result in molecules with useful characteristics. For instance, clustering a single kind of protein often greatly enhances biological signals, e.g. the repeating antigen structures on vaccines. Clustering proteins with different activities can also result in complexes with improved activities, e.g. substrate channeling by enzymes.

Typically, covalent protein interactions are mediated through disulfide bonds, but disulfides are reversible, inapplicable in reducing cellular compartments, and can interfere with protein folding. Peptide tags are convenient tools for protein analysis and modification because their small size minimises the perturbation to protein function. Peptide tags are simple to genetically encode and their small size reduces disruption from interfering with other interactions, cost of biosynthesis and introduction of immunogenicity. However, interactions between peptide tags and their peptide or polypeptide binding partners are rarely of high affinity, which limits their utility in the formation of stable complexes.

Proteins that are capable of spontaneous isopeptide bond formation (so-called "isopeptide proteins") have been advantageously used to develop peptide tag/polypeptide binding partner pairs (i.e. two-part linkers) which covalently bind to each other and provide irreversible interactions (see e.g. WO2011/098772, WO 2016/193746 and WO 2018/197854 all herein incorporated by reference). In this respect, proteins which are capable of spontaneous isopeptide bond formation may be expressed as separate fragments, to give a peptide tag and a polypeptide binding partner for the peptide tag, where the two fragments are capable of covalently reconstituting by isopeptide bond formation, thereby linking molecules or components fused to the peptide tag and its polypeptide binding partner. The isopeptide bond formed by the peptide tag and its polypeptide binding partner is stable under conditions where non-covalent interactions would rapidly dissociate, e.g. over long periods of time (e.g. weeks), at high temperature (to at least 95° C.), at high force, or with harsh chemical treatment (e.g. pH 2-11, organic solvent, detergents or denaturants).

Isopeptide bonds are amide bonds formed between carboxyl/carboxamide and amino groups, where at least one of the carboxyl or amino groups is outside of the protein main-chain (the backbone of the protein). Such bonds are chemically irreversible under typical biological conditions and they are resistant to most proteases. As isopeptide bonds are covalent in nature, they result in the some of the strongest measured protein interactions.

In brief, a two-part linker, i.e. a peptide tag and its polypeptide binding partner (a so-called peptide tag/binding partner pair) may be derived from a protein capable of spontaneously forming an isopeptide bond (an isopeptide protein), wherein the domains of the protein are expressed separately to produce a peptide tag that comprises one of the residues involved in the isopeptide bond (e.g. an aspartate or asparagine) and a peptide or polypeptide binding partner (or "catcher") that comprises the other residue involved in the isopeptide bond (e.g. a lysine) and at least one other residue required to form the isopeptide bond (e.g. a glutamate). Mixing the peptide tag and binding partner results in the spontaneous formation of an isopeptide bond between the tag and binding partner. Thus, by separately fusing the peptide tag and binding partner to different molecules or components, e.g. proteins, it is possible to covalently link said molecules or components together via an isopeptide bond formed between the peptide tag and binding partner, i.e. to form a linker between the molecules or components fused to the peptide tag and binding partner.

A peptide tag/binding partner pair (two-part linker), termed SpyTag/SpyCatcher, has been derived from the CnaB2 domain of the *Streptococcus pyogenes* FbaB protein (Zakeri et al., 2012, Proc Natl Acad Sci USA 109, E690-E697) and used in diverse applications, including biomaterials (Botyanszki et al., 2015, Biotechnology and bioengineering 112, 2016-2024; Chen et al., 2014, Proc Natl Acad Sci USA 108, 11399-11404), next generation sequencing (Stranges et al., 2016, Proc Natl Acad Sci USA 113, E6749-E6756), enzyme stabilisation (Schoene et al., 2016, Scientific Reports 6, 21151) and vaccine development (Brune et al., 2016, Scientific Reports 6, 19234; Thrane et al., 2016, Journal of Nanobiotechnology 14, 30). Whilst the speed of the formation of the isopeptide bond between SpyTag and SpyCatcher is satisfactory with purified components, the speed is limiting at cellular expression levels. Accordingly, modified versions of the SpyTag and SpyCatcher peptide and polypeptide, SpyTag002 and SpyCatcher002 (Keeble et al., 2017 Angew Chem Int Ed Engl. Vol. 56(52): pp. 16521-16525), with improved reaction rates have been developed (WO 2018/197854 herein incorporated by reference) that enable efficient reaction at low concentrations, particularly at bacterial cellular expression levels. However, the rate of reaction was still slower than diffusion controlled protein-protein interactions, the onset of which is taken to be $10^5$ to $10^6$ $M^{-1}s^{-1}$.

Although SpyTag/SpyCatcher technology has had many applications they have primarily been either on purified proteins, or in bacterial cells (Keeble and Howarth, 2019, Methods Enzymol. 617, 443-461; Banerjee and Howarth, 2018, Curr Opin Biotechnol. 51, 16-23), with far fewer involving mammalian cells. Mammalian proteins often have strict cell type requirements for expression due, for example, to the presence of post-translational modifications and often can be expressed only at low levels. Accordingly, there is a need for two-part peptide linkers with reaction rates in the range of diffusion controlled protein-protein interactions to facilitate their utility in mammalian cells.

The present inventors have now surprisingly determined that the reaction rate of the SpyCatcher002 polypeptide can be increased by a further order of magnitude (i.e. in the range of diffusion controlled protein-protein interactions) by modifying (i.e. mutating) the amino acid sequence of the SpyCatcher002 polypeptide (SEQ ID NO: 7), particularly by introducing non-conservative substitutions at the C-terminal end of the polypeptide. Thus, the modified SpyCatcher polypeptide of the invention (termed SpyCatcher003) has a reaction rate which is more than two orders of magnitude greater than the original SpyCatcher polypeptide (SEQ ID NO: 8). Notably and unexpectedly, the modifications that result in the increased reaction rate do not adversely affect other desirable properties of the polypeptide (binding partner), such as thermal stability.

Thus, advantageously, the mutant catcher of the invention (SpyCatcher003, SEQ ID NO: 1) may be used with its cognate peptide tag, e.g. SpyTag003, (i.e. as a two-part linker) in utilities where only low concentrations of the peptide and polypeptide binding partner are available, e.g. in vivo. The mutant catcher (polypeptide) of the invention also may be particularly useful in analytical assays that require high sensitivity and/or speed, e.g. Western blots in which the peptide tag (e.g. SpyTag003) is being used as an epitope tag. The improved rate constant of the mutant catcher (polypeptide) of the invention is also advantageous in reactions in which the tag and/or catcher are fused to molecules or components that may slow the reaction (e.g. large proteins) and in reactions where molecules or components fused to the tag and/or catcher cause steric hindrance, such as in the formation of virus-like particles for vaccine assembly. Moreover, the modifications required to improve the speed of reaction do not affect the other useful properties associated with SpyCatcher, i.e. thermal stability, reaction over a range of pH values and temperatures and in a wide range of buffers, including in the presence of detergent, and efficient expression in *Escherichia coli* and mammalian cells, such as efficient surface display on mammalian cells.

Whilst not wishing to be bound by theory, it is hypothesised that the five modifications to the SpyCatcher002 polypeptide (SEQ ID NO: 7) that result in the SpyCatcher003 polypeptide (SEQ ID NO: 1) function to stabilise the polypeptide (e.g. rigidify a loop in the polypeptide) and improve electrostatic interaction with the SpyTag peptides, particularly SpyTag003 (SEQ ID NO: 3). It is contemplated that each substitution in the polypeptide (peptide tag binding partner) of the invention (SEQ ID NO: 1, i.e. SpyCatcher polypeptide variant) relative to the amino acid sequence of SpyCatcher002 (SEQ ID NO: 7) may separately improve the activity of the polypeptide (peptide tag binding partner).

Furthermore, in view of the fact that the SpyCatcher polypeptide can be truncated at its N-terminus and C-terminus without significantly affecting its activity (Li et al., 2014, J Mol Biol.; 426(2): 309-317) it is contemplated that the polypeptide exemplified herein (i.e. SEQ ID NO: 1) may be truncated at the N-terminus and/or at the C-terminus without significantly reducing the activity of the polypeptide. In particular, SEQ ID NO: 1 may be truncated by up to 21 amino acids at the N-terminus (e.g. 5, 10, 15 or 20 amino acids) and by up to 9 amino acids at the C-terminus (e.g. 1, 2, 3, 4 or 5, 6, 7, 8 or 9 amino acids), preferably by up to 5 amino acids. In preferred embodiments, the polypeptide exemplified herein (i.e. SEQ ID NO: 1) is truncated only at the N-terminus.

Thus, in one aspect, the present invention therefore provides a polypeptide (peptide tag binding partner) comprising:
 i) an amino acid sequence as set forth in SEQ ID NO: 1; or
 ii) a portion of (i) comprising an amino acid sequence as set forth in SEQ ID NO: 2;
 iii) an amino acid sequence with at least 80% sequence identity to a sequence as set forth in SEQ ID NO: 1 (e.g. at least 85, 90, 95, 96, 97, 98 or 99% identical to a sequence as set forth in SEQ ID NO: 1), wherein said amino acid sequence comprises a lysine at position 31, a glutamic acid at position 77 and one or more of the following:
  1) glutamic acid at position 91;
  2) aspartic acid at position 103; and
  3) glutamic acid at position 108;
 wherein the specified amino acid residues are at positions equivalent to the positions in SEQ ID NO: 1; or
 iv) a portion of (iii) comprising an amino acid sequence with at least 80% sequence identity to a sequence as set forth in SEQ ID NO: 2 (e.g. at least 85, 90, 95, 96, 97, 98 or 99% identical to a sequence as set forth in SEQ ID NO: 2), wherein the amino acid sequence comprises a lysine at position 10, a glutamic acid at position 56 and one or more of the following:
  1) glutamic acid at position 70;
  2) aspartic acid at position 82; and
  3) glutamic acid at position 87;
 wherein the specified amino acid residues are at positions equivalent to the positions in SEQ ID NO: 2,
 and wherein said polypeptide is capable of spontaneously forming an isopeptide bond with a peptide comprising an amino acid sequence as set forth in SEQ ID NO: 3, wherein said isopeptide bond forms between the aspartic acid residue at position 10 of SEQ ID NO: 3 and the lysine residue at position 31 of SEQ ID NO: 1 or position 10 of SEQ ID NO: 2.

In a preferred embodiment of the invention, the polypeptide comprises:
 i) an amino acid sequence as set forth in SEQ ID NO: 1; or
 ii) a portion of (i) comprising an amino acid sequence as set forth in SEQ ID NO: 2;
 iii) an amino acid sequence with at least 80% sequence identity to a sequence as set forth in SEQ ID NO: 1 (e.g. at least 85, 90, 95, 96, 97, 98 or 99% identical to a sequence as set forth in SEQ ID NO: 1), wherein said amino acid sequence comprises a lysine at position 31, a glutamic acid at position 77 and three or more of the following:
1) proline at position 89;
2) glutamic acid at position 91;
3) aspartic acid at position 97;
4) aspartic acid at position 103; and
5) glutamic acid at position 108;
wherein the specified amino acid residues are at positions equivalent to the positions in SEQ ID NO: 1; or iv) a portion of (iii) comprising an amino acid sequence with at least 80% sequence identity to a sequence as set forth in SEQ ID NO: 2 (e.g. at least 85, 90, 95, 96, 97, 98 or 99% identical to a sequence as set forth in SEQ ID NO: 2), wherein the amino acid sequence comprises a lysine at position 10, a glutamic acid at position 56 and three or more of the following:
1) proline at position 68;
2) glutamic acid at position 70;
3) aspartic acid at position 76;
4) aspartic acid at position 82; and
5) glutamic acid at position 87;
wherein the specified amino acid residues are at positions equivalent to the positions in SEQ ID NO: 2,
and wherein said polypeptide is capable of spontaneously forming an isopeptide bond with a peptide comprising an amino acid sequence as set forth in SEQ ID NO: 3, wherein said isopeptide bond forms between the aspartic acid residue at position 10 of SEQ ID NO: 3 and the lysine residue at position 31 of SEQ ID NO: 1 or position 10 of SEQ ID NO: 2.

In some embodiments, the three amino acids are 1) and 2) and any one of 3)-5). However, any combination of three or more amino acids are contemplated herein, e.g. 3), 4) and 5), 2), 4) and 5), 1), 3) and 5), 2), 3) and 4), 1)-4), 2)-5) etc. In a particularly preferred embodiment, all five of the amino acids mentioned above are present in the variant polypeptide of the invention.

In embodiments in which the polypeptide (peptide tag binding partner) variants (i.e. sequence identity related polypeptides and portions thereof) of the invention do not contain all of the residues specified above, it is preferred that in the specified positions the variants contain the amino acid residues at the equivalent positions in the SpyCatcher002 polypeptide (SEQ ID NO: 7). The equivalent positions can readily be determined by comparing the amino acid sequence of the polypeptide (peptide tag binding partner) variant with SEQ ID NO: 7, e.g. using the BLASTP algorithm.

Thus, by way of example, in embodiments where the polypeptide (peptide tag binding partner) of the invention comprises an amino acid sequence with at least 80% sequence identity to a sequence as set forth in SEQ ID NO: 1, if the residue at position 91 (or the equivalent position) is not glutamic acid, it is preferred that the residue is threonine. Similarly, if the residue at position 103 (or the equivalent position) is not aspartic acid, it is preferred that the residue is asparagine. If the residue at position 108 (or the equivalent position) is not glutamic acid, it is preferred that the residue is lysine. If the residue at position 89 (or the equivalent position) is not proline, it is preferred that the residue is alanine. If the residue at position 97 (or the equivalent position) is not aspartic acid, it is preferred that the residue is glutamine. This applies to other residues specified below.

In some embodiments, a polypeptide (peptide tag binding partner) variant of the present invention may differ from SEQ ID NO: 1 by, for example, 1 to 50, 1 to 45, 1 to 40, 1 to 35, 1 to 30, 1 to 25, 1 to 20, 1 to 15, 1 to 10, 1 to 8, 1 to 6, 1 to 5, 1 to 4, e.g. 1, 2 or 3 amino acid substitutions, insertions and/or deletions, preferably 1 to 23, 1 to 20, 1 to 15, 1 to 10, 1 to 8, 1 to 6, 1 to 5, 1 to 4, e.g. 1, 2 or 3 amino acid substitutions and/or 1 to 30, 1 to 25, 1 to 20, 1 to 15, 1 to 10, 1 to 8, 1 to 6, 1 to 5, 1 to 4, e.g. 1, 2 or 3 amino acid deletions. As discussed below, in some embodiments, it is preferred that deletions are at the N- and/or C-terminus, i.e. truncations, preferably N-terminal truncations, thereby generating polypeptide portions of SEQ ID NO: 1 as defined above, e.g. SEQ ID NO: 2.

In some embodiments, any mutations that are present in the polypeptide (peptide tag binding partner) of the present invention relative to the exemplified polypeptide (SEQ ID NO: 1) may be conservative amino acid substitutions. A conservative amino acid substitution refers to the replacement of an amino acid by another which preserves the physicochemical character of the polypeptide (e.g. D may be replaced by E or vice versa, N by Q, or L or I by V or vice versa). Thus, generally the substituting amino acid has similar properties, e.g. hydrophobicity, hydrophilicity, electronegativity, bulky side chains etc. to the amino acid being replaced. Isomers of the native L-amino acid e.g. D-amino acids may be incorporated.

Thus, in some embodiments in which the polypeptide (peptide tag binding partner) variants of the invention do not contain all of the residues specified above and further below (i.e. all of the mutations in SEQ ID NO: 1 relative to SEQ ID NO: 7). In the positions specified herein, particularly the positions specified below, the variant may contain a conservative substitution of the amino acid residues at the equivalent positions in the SpyCatcher002 peptide (SEQ ID NO: 7). Thus, for example, if the residue at position 13 (or the equivalent position) is not proline or glutamine it is preferred that the residue is asparagine.

Accordingly, in some embodiments, the polypeptide (peptide tag binding partner) of the invention may comprise an amino acid sequence with at least 80% sequence identity to a sequence as set forth in SEQ ID NO: 1, wherein said amino acid sequence comprises a lysine at position 31, a glutamic acid at position 77, any three or more (preferably four or five) of the following:
1) proline at position 89;
2) glutamic acid at position 91;
3) aspartic acid at position 97;
4) aspartic acid at position 103; and
5) glutamic acid at position 108;
and any one or more (preferably two, three, four, five or six) of the following:
6) threonine at position 2;
7) proline at position 13;
8) arginine at position 37;
9) histidine at position 62;
10) glutamic acid at position 105; and
11) threonine at position 113,
wherein the specified amino acid residues are at positions equivalent to the positions in SEQ ID NO: 1.

The presence of an aspartic acid residue at position 2 (based on the numbering of SEQ ID NO: 1 and SEQ ID NO: 7) of the polypeptide (peptide tag binding partner) mutants (i.e. variants) of the invention may result in the formation of an unwanted side-reaction—a polypeptide (peptide tag binding partner) dimer wherein the polypeptides are conjugated via an isopeptide bond. The presence of threonine or alanine at position 2 eliminates the unwanted side-reaction and may further improve the rate of reaction the polypeptide (peptide tag binding partner) with its cognate peptide tag. Thus, in some embodiments, the polypeptide (peptide tag binding partner) of the invention may comprise an amino acid sequence with at least 80% sequence identity to a sequence as set forth in SEQ ID NO: 1, wherein said amino acid sequence comprises a threonine at position 2, a lysine at position 31, a glutamic acid at position 77, any three or more (preferably four or five) of the following:
  1) proline at position 89;
  2) glutamic acid at position 91;
  3) aspartic acid at position 97;
  4) aspartic acid at position 103; and
  5) glutamic acid at position 108;
  and any one or more (preferably two, three, four or five) of the following:
  6) proline at position 13;
  7) arginine at position 37;
  8) histidine at position 62;
  9) glutamic acid at position 105; and
  10) threonine at position 113,
  wherein the specified amino acid residues are at positions equivalent to the positions in SEQ ID NO: 1.

It is contemplated that the polypeptide (peptide tag binding partner) of the invention may comprise any combination of the specified amino acid residues defined above comprising at least three amino acid residues from those listed in 1)-5) as defined above (preferably four or all five), and at least one (e.g. two, three, four, five or six of the amino acid residues specified above in lists 6)-11) and 6)-10)), e.g. 6) and 7), 6) and 8), 6 and 9), 6) and 10), 6) and 11), 7) and 8), 7) and 9), 7) and 10), 7) and 11) etc., 6), 7) and 8), 6), 8) and 9), 6), 8) and 10) etc. However, some particularly preferred combinations include:
  a) 1) threonine at position 2;
     2) proline at position 13;
     3) lysine at position 31;
     4) arginine at position 37;
     5) histidine at position 62;
     6) glutamic acid at position 77;
     7) glutamic acid at position 91;
     8) aspartic acid at position 103;
     9) glutamic acid at position 105;
     10) glutamic acid at position 108; and
     11) threonine at position 113;
  b) 1) threonine at position 2;
     2) proline at position 13;
     3) lysine at position 31;
     4) arginine at position 37;
     5) histidine at position 62;
     6) glutamic acid at position 77;
     7) proline at position 89;
     8) glutamic acid at position 91;
     9) aspartic acid at position 103;
     10) glutamic acid at position 105;
     11) glutamic acid at position 108; and
     12) threonine at position 113; and
  c) 1) threonine at position 2;
     2) proline at position 13;
     3) lysine at position 31;
     4) arginine at position 37;
     5) histidine at position 62;
     6) glutamic acid at position 77;
     7) proline at position 89;
     8) glutamic acid at position 91;
     9) aspartic acid at position 97;
     10) aspartic acid at position 103;
     11) glutamic acid at position 105;
     12) glutamic acid at position 108; and
     13) threonine at position 113;
  wherein the specified amino acid residues are at positions equivalent to the positions in SEQ ID NO: 1.

In some further embodiments, the polypeptide (peptide tag binding partner) variants defined above may also comprise a glycine at position 9 and/or a threonine at position 19.

Thus, the polypeptide (peptide tag binding partner) of the present invention particularly may be at least 80% identical to the exemplified sequence as set forth in SEQ ID NO: 1 and more particularly is at least 85, 90, 95, 96, 97, 98 or 99% identical to SEQ ID NO: 1, wherein the polypeptide variant comprises a lysine at position 31 (or an equivalent position), a glutamic acid at position 77 (or an equivalent position) and all of the following:
  1) threonine at position 2;
  2) glycine at position 9;
  3) proline at position 13;
  4) threonine at position 19;
  5) arginine at position 37;
  6) histidine at position 62;
  7) proline at position 89;
  8) glutamic acid at position 91;
  9) aspartic acid at position 97;
  10) aspartic acid at position 103;
  11) glutamic acid at position 105;
  12) glutamic acid at position 108; and
  13) threonine at position 113;
wherein the specified amino acid residues are at positions equivalent to the positions in SEQ ID NO: 1.

In some still further embodiments, the polypeptide (peptide tag binding partner) variants defined above may also comprise one or more (preferably all) of the following:
  1) glutamic acid at position 34;
  2) serine at position 50;
  3) tyrosine or serine (preferably serine) at position 69;
  4) glycine at position 83; and
  5) valine at position 86;
  wherein the specified amino acid residues are at positions equivalent to the positions in SEQ ID NO: 1.

Thus, the polypeptide (peptide tag binding partner) of the present invention particularly may be at least 80% identical to the exemplified sequence as set forth in SEQ ID NO: 1 and more particularly is at least 85, 90, 95, 96, 97, 98 or 99% identical to SEQ ID NO: 1, wherein the polypeptide variant comprises a lysine at position 31 (or an equivalent position), a glutamic acid at position 77 (or an equivalent position) and all of the following:
  1) threonine at position 2;
  2) glycine at position 9;
  3) proline at position 13;
  4) threonine at position 19;
  5) glutamic acid at position 34;
  6) arginine at position 37;
  7) serine at position 50;
  8) histidine at position 62;
  9) tyrosine at position 69;
  10) glycine at position 83;
  11) valine at position 86;
  12) proline at position 89;
  13) glutamic acid at position 91;
  14) aspartic acid at position 97;
  15) aspartic acid at position 103;
  16) glutamic acid at position 105;
  17) glutamic acid at position 108; and
  18) threonine at position 113;

wherein the specified amino acid residues are at positions equivalent to the positions in SEQ ID NO: 1.

As mentioned above, in some preferred embodiments, the polypeptide variants of the invention comprise amino acid substitutions relative to SEQ ID NO: 1. Thus, in some yet still further embodiments, the polypeptide (peptide tag binding partner) variants defined above (e.g. variants having the residues 1-11, 1-12, 1-13 or 1-18 as defined above) may also comprise one or more (i.e. two, three, four or five) of the following substitutions relative to SEQ ID NO: 1:

1) substitution of lysine with glutamine at position 52 (i.e. glutamine at position 52);
2) substitution of valine with aspartic acid at position 63 (i.e. aspartic acid at position 63);
3) substitution of tyrosine with serine at position 69 (i.e. serine at position 69);
4) substitution of threonine with leucine at position 88 (i.e. leucine at position 88); and
5) substitution of glutamic acid with proline at position 96 (i.e. proline at position 96);

wherein the specified amino acid residues are at positions equivalent to the positions in SEQ ID NO: 1.

Thus, in some embodiments, the polypeptide variant of the invention may contain the residues specified in 1)-8) and 10)-18) in the list above, wherein the tyrosine residue at position 69 is substituted with serine. This polypeptide variant may further comprise one or more of the other substitutions specified above.

The polypeptide variants of the invention may comprise amino acid deletions relative to SEQ ID NO: 1. While N-terminal deletions are preferred, in some embodiments the polypeptide variant of the invention may comprise a deletion at the position equivalent to 17 of SEQ ID NO: 1, i.e. deletion of a methionine at position 17 of SEQ ID NO: 1.

In particularly preferred embodiments, the polypeptide variants of the invention do not comprise amino acid deletions at positions equivalent to 14-16 and/or 85-89 of SEQ ID NO: 1.

The term "linker" as used herein refers to molecules that function to link, i.e. conjugate or join, two molecules or components together, preferably by a covalent bond, e.g. an isopeptide bond. Thus, the polypeptide of the invention and its peptide tag may be viewed as a two-part linker, wherein formation of the isopeptide bond between the first part, i.e. polypeptide, and second part, i.e. peptide tag, reconstitutes the linker, thereby joining molecules or components fused or conjugated to said first and second parts of the linker. Alternatively stated, the polypeptide of the invention and its peptide tag may be viewed as a cognate pair that functions as a linker, i.e. a peptide tag and polypeptide cognate pair or a peptide tag and binding partner cognate pair. These terms are used interchangeably throughout the description.

The term "cognate" refers to components that function together. Thus, in the context of the present invention, a cognate pair refers to a peptide tag and a polypeptide of the invention that react together spontaneously to form an isopeptide bond. Thus, a two-part linker comprising a peptide tag and polypeptide that react together efficiently to form an isopeptide bond under conditions that enable the spontaneous formation of said isopeptide bond can also be referred to as being a "complementary pair", i.e. a peptide tag and polypeptide complementary pair.

Thus, a cognate peptide tag refers to a SpyTag peptide or variant thereof (e.g. a peptide comprising an amino acid sequence set forth in one of SEQ ID NOs: 3-6) with which the polypeptide of the invention reacts spontaneously to form an isopeptide bond. In some embodiments, the cognate peptide tag may be a peptide comprising an amino acid sequence with at least 80% (e.g. at least 85, 90, 91, 92, 93, 94, 95, 96, 97, 98 or 99%) sequence identity to an amino acid sequence as set forth in one of SEQ ID NOs: 3-5 that is capable of spontaneously forming an isopeptide bond with a polypeptide comprising an amino acid sequence as set forth in SEQ ID NO: 1, e.g. between an aspartic acid in the cognate peptide tag (i.e. an aspartic acid at position equivalent to position 10 in SEQ ID NO: 3, position 8 in SEQ ID NO: 4 or position 7 in SEQ ID NO: 5) and the lysine residue at position 31 of SEQ ID NO: 1.

In some embodiments, the peptide tag comprises an amino acid sequence as set forth in SEQ ID NO: 6, wherein:
(i) X at position 1 is arginine or no amino acid;
(ii) X at position 2 is glycine or no amino acid;
(iii) X at position 5 is histidine or threonine, preferably histidine;
(iv) X at position 11 is alanine, glycine or valine, preferably alanine; and
(v) X at position 14 is arginine or lysine, preferably arginine, wherein when X at position 1 is no amino acid, X at position 2 is no amino acid,
and wherein said peptide is capable of spontaneously forming an isopeptide bond with a polypeptide comprising an amino acid sequence as set forth in SEQ ID NO: 1, wherein said isopeptide bond forms between the aspartic acid residue at position 10 of SEQ ID NO: 6 and the lysine residue at position 31 of SEQ ID NO: 1.

Thus, in some preferred embodiments, the peptide tag comprises or consists of an amino acid sequence as set forth in SEQ ID NO: 3, 4 or 5.

Thus, the invention further provides a two-part linker comprising a peptide (peptide tag) and polypeptide (a peptide tag binding partner), wherein:

a) said polypeptide (peptide tag binding partner) comprises an amino acid sequence as defined above (i.e. SEQ ID NO: 1 or a variant thereof); and
b) said peptide (peptide tag) comprises an amino acid sequence as defined above (e.g. an amino acid sequence as set forth in SEQ ID NO: 3, 4, 5 or 6), and wherein said peptide (peptide tag) and polypeptide (peptide tag binding partner) are capable of spontaneously forming an isopeptide bond between the aspartic acid residue in the peptide tag (e.g. at position 8 in SEQ ID NO: 4, at position 7 of SEQ ID NO: 5 or position 10 of SEQ ID NO: 3 or 6) and the lysine residue at position 31 of SEQ ID NO: 1.

The lysine residue at position 31 of polypeptide (peptide tag binding partner) of the invention (SEQ ID NO: 1) spontaneously forms an isopeptide bond with the aspartic acid residue at position 8 in SEQ ID NO: 4, at position 7 of SEQ ID NO: 5 or position 10 of SEQ ID NO: 3 or 6 under various conditions including those explained below that are suitable for the formation of an isopeptide bond between said peptide tag and polypeptide (peptide tag binding partner). It is evident from the Examples below that the polypeptide (peptide tag binding partner) of the invention is active under a range of conditions and capable of reacting with a variety of peptide tags (particularly SEQ ID NOs: 3-5).

For instance, the polypeptide (peptide tag binding partner) is active (i.e. capable of spontaneously forming an isopeptide bond with a peptide tag as described herein) in a variety of buffers including phosphate buffered saline (PBS), 4-(2-hydroxyethyl)-1-piperazineethanesulfonic acid (HEPES), HEPES buffered saline (HBS), and Tris buffered saline (TBS), both with and without EDTA. The polypeptide (peptide tag binding partner) is active at a pH of about 3.0-8.0, e.g. 4.0-7.0, 5.0-7.0, such as about 5.5-6.5, over a wide range of temperatures, e.g. 0-40° C., e.g. 1, 2, 3, 4, 5, 10, 12, 15, 18, 20, 22, 25, 28, 30, 35 or 37° C., preferably about 25-35° C., e.g. about 25° C. The polypeptide (peptide tag binding partner) of the invention is also active in the presence of the commonly used detergents, such as Tween 20 and Triton X-100, e.g. up to a concentration of about 1% (v/v), and in the presence of urea, e.g. up to a concentration of about 3 M. The skilled person would readily be able to determine other suitable conditions.

Thus, in some embodiments, conditions that are suitable for the formation of an isopeptide bond between the polypeptide (peptide tag binding partner) of the invention and a cognate peptide tag (e.g. a peptide comprising or consisting of an amino acid sequence as set forth in SEQ ID NOs: 3-6, preferably 3-5) includes any conditions in which contacting the peptide tag and polypeptide (peptide tag binding partner) of the invention results in the spontaneous formation of an isopeptide bond between said peptide tag and polypeptide (peptide tag binding partner), particularly between the aspartic acid residue at position 10 of SEQ ID NO: 3 or 6 (or equivalent position, e.g. position 7 of SEQ ID NO: 5 or position 8 of SEQ ID NO: 4) and the lysine residue at position 31 of SEQ ID NO: 1 (or equivalent position). For instance, contacting said peptide tag and polypeptide (peptide tag binding partner) in buffered conditions, e.g. in a buffered solution or on a solid phase (e.g. column) that has been equilibrated with a buffer, such as PBS. The step of contacting may be at any suitable pH, such as pH 3.0-8.0, e.g. 4.0-7.0, such as pH 4.2, 4.4, 4.6, 4.8, 5.0, 5.2, 5.4, 5.6, 5.8, 6.0, 6.2, 6.4, 6.6, 6.8 or 7.0. Additionally or alternatively, the step of contacting may be at any suitable temperature, such as about 0-40° C., e.g. about 1-39, 2-38, 3-37, 4-36, 5-35, 6-34, 7-33, 8-32, 9-31 or 10-30° C., e.g. about 10, 12, 15, 18, 20, 22, 25, 28, 30, 33, 35 or 37° C., preferably about 25-35° C., e.g. about 25° C.

In some embodiments, contacting a peptide tag and a polypeptide (peptide tag binding partner) of the invention "under conditions that enable the spontaneous formation of an isopeptide bond" includes contacting the peptide tag and polypeptide in the presence of a chemical chaperone, e.g. a molecule that enhances or improves the reactivity of the peptide tag and polypeptide (peptide tag binding partner). In some embodiments, the chemical chaperone is TMAO (trimethylamine N-oxide). In some embodiments, the chemical chaperone, e.g. TMAO, is present in the reaction at a concentration of at least about 0.2 M, e.g. at least 0.3, 0.4, 0.5, 1.0, 1.5, 2.0 or 2.5 M, e.g. about 0.2-3.0 M, 0.5-2.0 M, 1.0-1.5 M.

As noted above, the formation of the isopeptide bond between the peptide tag described herein and polypeptide (peptide tag binding partner) of the invention is spontaneous. In this respect, the polypeptide (peptide tag binding partner) comprises a glutamic acid at position 77 (or an equivalent position, based on the numbering of SEQ ID NO: 1) that facilitates, e.g. induces, promotes or catalyses, the formation of the isopeptide bond between the aspartate and lysine residues in the peptide tag and polypeptide (peptide tag binding partner), respectively.

The term "spontaneous" as used herein refers to an isopeptide bond, which can form in a protein or between peptides or proteins (e.g. between two peptides or a peptide and a protein, i.e. the peptide tag and polypeptide (peptide tag binding partner) of the invention) without any other agent (e.g. an enzyme catalyst) being present and/or without chemical modification of the protein or peptide, e.g. without native chemical ligation or chemical coupling using 1-ethyl-3-(3-dimethylaminopropyl) carbodiimide (EDC). Thus, native chemical ligation to modify a peptide or protein having a C-terminal thioester is not carried out.

Thus, a spontaneous isopeptide bond can form between a peptide tag as defined herein and a polypeptide (peptide tag binding partner) of the invention when in isolation and without chemical modification of the peptide tag and/or polypeptide of the invention. A spontaneous isopeptide bond may therefore form of its own accord in the absence of enzymes or other exogenous substances and without chemical modification of the peptide tag and/or polypeptide of the invention.

A spontaneous isopeptide bond may form almost immediately after contact of the peptide tag and polypeptide (peptide tag binding partner) of the invention, e.g. within 1, 2, 3, 4, 5, 10, 15, 20, 25 or 30 minutes, or within 1, 2, 4, 8, 12, 16, 20 or 24 hours.

The speed of isopeptide formation will be dependent on the concentration of the peptide tag and polypeptide reactants and the conditions of the reaction, e.g. temperature. In some embodiments, spontaneous isopeptide bond formation may complete for about 90% or more of the reactants in about 1 minute or less, e.g. where the reactants are each present at a concentration of about 10 µM at a reaction temperature of about 25° C. In some embodiments, spontaneous isopeptide bond formation may complete for about 50% or more of the reactants in about 1 minute or less, e.g. where the reactants are each present at a concentration of about 100 nM at a reaction temperature of about 25° C. In some embodiments, spontaneous isopeptide bond formation may complete for about 10% or more of the reactants in about 1 minute or less, e.g. where the reactants are each present at a concentration of about 10 nM at a reaction temperature of about 25° C.

Alternatively viewed, in some embodiments, spontaneous isopeptide bond formation may complete for about 90% or more of the reactants in about 5 minutes or less, e.g. where the reactants are each present at a concentration of about 100 nM at a reaction temperature of about 25° C. In some embodiments, spontaneous isopeptide bond formation may complete for about 90% or more of the reactants in about 15 minutes or less, e.g. where the reactants are each present at a concentration of about 10 nM at a reaction temperature of about 25° C.

The other reaction conditions, e.g. buffer, pH etc. used to determine the speed of reaction defined above may be any conditions defined herein. In some embodiments, the reaction conditions are those used in the Examples. For instance, in some embodiments, the spontaneous isopeptide bond formation is complete in the amounts specified above in succinate-phosphate-glycine buffer at a pH of about 7.0, particularly buffer comprising 12.5 mM succinic acid, 43.75 mM $NaH_2PO_4$, 43.75 mM glycine at pH 7.0.

The polypeptide (peptide tag binding partner) of the invention encompasses mutant forms of the polypeptide (peptide tag binding partner) (i.e. referred to herein as homologues, variants or derivatives), which are structurally similar to the exemplified polypeptide (peptide tag binding partner) set forth in SEQ ID NO: 1. The polypeptide (peptide tag binding partner) variants of the invention are able to function as a peptide tag binding partner (catcher), i.e. capable of spontaneously forming an isopeptide bond between the aspartic acid at position 10 (or equivalent position) of a peptide tag as defined herein and the lysine at position 31 (or equivalent position) of the polypeptide (peptide tag binding partner) variant under suitable conditions as defined above.

In cases where a polypeptide (peptide tag binding partner) variant comprises mutations, e.g. deletions or insertions, relative to SEQ ID NO: 1, the residues specified above are present at equivalent amino acid positions in the variant polypeptide (peptide tag binding partner) sequence. In some embodiments, deletions in the polypeptide (peptide tag binding partner) variants of the invention are not N-terminal and/or C-terminal truncations, particularly not C-terminal truncations.

However, as mentioned above, it is contemplated that the polypeptide exemplified herein (i.e. SEQ ID NO: 1) may be truncated at the N-terminus and/or C-terminus without significantly reducing the activity of the polypeptide. In particular, the SEQ ID NO: 1 may be truncated by up to 21 amino acids at the N-terminus (e.g. 5, 10, 15 or 20 amino acids) and/or by up to 9 amino acids at the C-terminus (e.g. 1, 2, 3, 4, 5, 6, 7, 8 or 9 amino acids), preferably 5 amino acids or fewer. Thus, the term variant as used herein includes truncation variants of the exemplified polypeptide. Alternatively, viewed, the invention may be seen to provide a portion of the exemplified polypeptide, wherein said portion comprises an amino acid sequence as set forth in SEQ ID NO: 2 or a variant thereof, as discussed above.

As referred to herein a "portion" comprises at least an amino acid sequence as set forth in SEQ ID NO: 2, i.e. at least 83, 84, 85, 86, 87, 88, 89, 90, 91, 92, 93, 94, 95, 100, 105, 110 or more amino acids of SEQ ID NO: 1 (the sequence from which it is derived) containing an amino acid sequence as set forth in SEQ ID NO: 2. Thus, said portion may be obtained from a central or N-terminal or C-terminal portion of the sequence. Preferably said portion is obtained from the central portion, i.e. it comprises an N-terminal and/or C-terminal truncation, preferably an N-terminal truncation, as defined above. Notably, "portions" as described herein are polypeptides of the invention and therefore satisfy the identity (relative to a comparable region) conditions and functional equivalence conditions mentioned herein.

In some embodiments, a peptide tag for use with the polypeptide of the invention may be a variant of the sequences described herein, e.g. may differ from SEQ ID NOs: 3-6 by for example 1 to 5, 1 to 4, e.g. 1, 2 to 3 amino acid substitutions, insertions and/or deletions, preferably substitutions, as defined above. In some embodiments, the polypeptide (peptide tag binding partner) variant of the present invention may differ from SEQ ID NO: 1 as defined above. However, the peptide and polypeptide variants must retain their functional activity, i.e. their ability to spontaneously form an isopeptide bond with their cognate binding partner and peptide, respectively.

Sequence identity may be determined by any suitable means known in the art, e.g. using the SWISS-PROT protein sequence databank using FASTA pep-cmp with a variable pamfactor, and gap creation penalty set at 12.0 and gap extension penalty set at 4.0, and a window of 2 amino acids. Other programs for determining amino acid sequence identity include the BestFit program of the Genetics Computer Group (GCG) Version 10 Software package from the University of Wisconsin. The program uses the local homology algorithm of Smith and Waterman with the default values: Gap creation penalty—8, Gap extension penalty=2, Average match=2.912, Average mismatch=−2.003.

Preferably said comparison is made over the full length of the sequence, but may be made over a smaller window of comparison, e.g. less than 100, 80 or 50 contiguous amino acids.

Preferably the peptide tag and polypeptide (peptide tag binding partner) variants (e.g. sequence identity-related variants) are functionally equivalent to the peptide tag and polypeptide (peptide tag binding partner) having a sequence as set forth in SEQ ID NOs: 3-5 or SEQ ID NOs: 1 or 2, respectively. As referred to herein, "functional equivalence" refers to variants of the peptide tag defined herein and polypeptide (peptide tag binding partner) of the invention discussed above that may show some reduced efficacy in the spontaneous formation of an isopeptide bond with its respective partner (e.g. lower expression yield, lower reaction rate, or activity in a limited range of reaction conditions (e.g. narrower temperature range, such as 10-30° C. etc.)) relative to the parent molecule (i.e. the molecule with which it shows sequence homology), but preferably are as efficient or are more efficient.

A mutant or variant peptide tag with activity that is "equivalent" to the activity of a peptide tag comprising or consisting of an amino acid sequence as set forth in one of SEQ ID NOs: 3-5 may have activity that is similar (i.e. comparable) to the activity of a peptide tag comprising or consisting of an amino acid sequence as set forth in one of SEQ ID NOs: 3-5, i.e. such that the practical applications of the peptide tag are not significantly affected, e.g. within a margin of experimental error. Thus, an equivalent peptide tag activity means that the mutant or variant peptide tag is capable of spontaneously forming an isopeptide bond with a polypeptide (peptide tag binding partner, e.g. comprising or consisting of an amino acid sequence as set forth in SEQ ID NO: 1 or 2) with a similar reaction rate (i.e. rate constant as discussed below) and/or yield to a peptide tag comprising or consisting of an amino acid sequence as set forth in one of SEQ ID NOs: 3-5 under the same conditions.

Similarly, a mutant or variant polypeptide (peptide tag binding partner) of the invention with activity that is "equivalent" to the activity of a polypeptide (peptide tag binding partner) comprising or consisting of an amino acid sequence as set forth in SEQ ID NO: 1 or 2 (preferably SEQ ID NO: 1) may have activity that is similar (i.e. comparable) to the activity of a polypeptide (peptide tag binding partner) comprising or consisting of an amino acid sequence as set forth in SEQ ID NO: 1 or 2 (preferably SEQ ID NO: 1), i.e. such that the practical applications of the polypeptide (peptide tag binding partner) are not significantly affected, e.g. within a margin of experimental error. Thus, an equivalent polypeptide (peptide tag binding partner) activity means that the mutant or variant polypeptide (peptide tag binding partner) of the invention is capable of spontaneously forming an isopeptide bond with a peptide tag (e.g. comprising or consisting of an amino acid sequence as set forth in one of SEQ ID NOs: 3-6) with a similar reaction rate (i.e. rate constant as discussed below) and/or yield to a polypeptide (peptide tag binding partner) comprising or consisting of an amino acid sequence as set forth in SEQ ID NO: 1 or 2 (preferably SEQ ID NO: 1) under the same conditions.

The activity of different peptide tag and polypeptides (e.g. SEQ ID NO: 3 versus mutant and SEQ ID NO: 1 versus mutant, respectively) measured under the same reaction conditions, e.g. temperature, substrates (i.e. peptide tag or polypeptide sequences) and their concentration, buffer, salt etc. as exemplified above, can be readily compared to determine whether the activity for each peptide tag and polypeptide is higher, lower or equivalent.

In particular, the peptide tag variants defined herein and the polypeptide variants of the invention have an equivalent rate constant to the peptide tag and polypeptide having a sequence as set forth in SEQ ID NOs: 3-5 or SEQ ID NOs: 1 or 2, respectively. The rate constant refers to the coefficient of proportionality relating the rate of the reaction (the formation of an isopeptide bond) at a given temperature to the product of the concentrations of reactants (i.e. the product of the concentration of the peptide tag and polypeptide of the invention).

Thus, the activity, e.g. rate constant, of the variant (e.g. mutant) peptide tag disclosed herein may be at least 60%, e.g. at least 70, 75, 80, 85 or 90% of the activity, e.g. rate constant, of a peptide tag comprising or consisting of an amino acid sequence as set forth in one of SEQ ID NOs: 3-5, such as at least 91, 92, 93, 94, 95, 96, 97, 98 or 99% of the activity of a peptide tag comprising or consisting of an amino acid sequence as set forth in one of SEQ ID NOs: 3-5. Alternatively viewed, the activity, e.g. rate constant, of the mutant peptide tag may be no more than 40% lower than the activity, e.g. rate constant, of a peptide tag comprising or consisting of an amino acid sequence as set forth in one of SEQ ID NOs: 3-5, e.g. no more than 35, 30, 25 or 20% lower than the activity, e.g. rate constant, of a peptide tag comprising or consisting of an amino acid sequence as set forth in one of SEQ ID NOs: 3-5, such as no more than 10, 9, 8, 7, 6, 5, 4, 3, 2 or 1% lower than the activity, e.g. rate constant, of a peptide tag comprising or consisting of an amino acid sequence as set forth in one of SEQ ID NOs: 3-5.

Similarly, the activity, e.g. rate constant, of the variant polypeptide (peptide tag binding partner) of the invention may be at least 60%, e.g. at least 70, 75, 80, 85 or 90% of the activity, e.g. rate constant, of a polypeptide comprising or consisting of an amino acid sequence as set forth in SEQ ID NO: 1 or 2, such as at least 91, 92, 93, 94, 95, 96, 97, 98 or 99% of the activity, e.g. rate constant, of a polypeptide comprising or consisting of an amino acid sequence as set forth in SEQ ID NO: 1 or 2. Alternatively viewed, the activity of the variant polypeptide may be no more than 40% lower than the activity, e.g. rate constant, of a polypeptide comprising or consisting of an amino acid sequence as set forth in SEQ ID NO: 1 or 2, e.g. no more than 35, 30, 25 or 20% lower than the activity, e.g. rate constant, of a polypeptide comprising or consisting of an amino acid sequence as set forth in SEQ ID NO: 1 or 2, such as no more than 10, 9, 8, 7, 6, 5, 4, 3, 2 or 1% lower than the activity, e.g. rate constant, of a polypeptide comprising or consisting of an amino acid sequence as set forth in SEQ ID NO: 1 or 2.

Notably, the rate constant of the reaction of the peptide tag disclosed herein and the polypeptide of the invention may be lower than the values described in the Examples when the peptide tag and/or polypeptide are fused to large molecules or components (e.g. proteins), which diffuse slower than the isolated peptide tag and polypeptide. Moreover, the rate constant may be reduced if the molecules or components to which the peptide tag and/or polypeptide are fused cause steric hindrance to the reaction. Accordingly, when measuring the rate constant of the reaction of the peptide tag variants disclosed herein and the polypeptide variants of the invention, it is preferred that measurement is performed using isolated peptide tags and polypeptides, i.e. peptide tags and polypeptides that are not fused or conjugated to other molecules or components.

However, as shown in the Examples, it is often convenient to measure the rate constant of the reaction of the polypeptide variants of the invention using a peptide tag that is fused to a polypeptide. Thus, when measuring and comparing the rate constants of different polypeptide variants using a peptide tag that is fused to a polypeptide, it is preferred that a polypeptide fused to the peptide tag is the same size, preferably the same sequence, in all reactions.

It will be evident that fusion to large molecules or components and/or steric hindrance will also affect the rate constant of other peptide tags and polypeptides, e.g. SpyTag, SpyTag002, SpyCatcher and SpyCatcher002. Thus, the enhancements in rate constant of the polypeptide of the invention may still be advantageous when the polypeptide of the invention and its cognate peptide tag are used at high concentrations (e.g. when fused to large molecules or components) in addition to their use at low concentrations.

The reaction rate and rate constant can be assessed by any suitable means known in the art and as described in the Examples and in WO 2018/197854 (herein incorporated by reference). For instance, the reaction rate may be monitored by (i) assessing the mobility of the reaction products on SDS-PAGE after boiling in SDS or other strong denaturing treatment that would disrupt all non-covalent interactions or (ii) by mass spectrometry.

Hence, any modification or combination of modifications may be made to SEQ ID NO: 1 to produce a variant polypeptide (peptide tag binding partner) of the invention, provided that the variant polypeptide (peptide tag binding partner) comprises a lysine residue at a position equivalent to position 31 of SEQ ID NO: 1 and a glutamic acid residue at a position equivalent to position 77 of SEQ ID NO: 1 and at least one (preferably 2 or 3) other amino acid residue(s) at positions equivalent to positions 91, 103 and 108, optionally one or both amino acid residue(s) at positions equivalent to positions 89 and 97, further optionally one or more (preferably 2, 3, 4, 5, 6, 7 or 8) amino acid residue(s) at positions equivalent to positions 2, 9, 13, 19, 37, 62, 105 and 113 of SEQ ID NO: 1, and further optionally one or more (preferably 2, 3, 4 or 5) amino acid residue(s) at positions equivalent to positions 34, 50, 69, 83 and 86 of SEQ ID NO: 1 as defined above and retains the functional characteristics defined above, i.e. it results in a polypeptide (peptide tag binding partner) capable of spontaneously forming an isopeptide bond with a peptide tag comprising or consisting of an amino acid sequence as set forth in one of SEQ ID NOs: 3-5 and optionally has an equivalent or higher yield, reaction rate, e.g. rate constant, temperature and/or buffer range relative to a polypeptide (peptide tag binding partner) having an amino acid sequence as set forth in SEQ ID NO: 1.

In some embodiments, the variant polypeptide (peptide tag binding partner) of the invention comprises the residues specified above and one or more (2, 3, 4 or 5) of the following substitutions: K52Q, V63D, Y69S, T88L and E96P (relative to SEQ ID NO: 1), and retains the functional characteristics defined above, i.e. it results in a polypeptide (peptide tag binding partner) capable of spontaneously forming an isopeptide bond with a peptide tag comprising or consisting of an amino acid sequence as set forth in one of SEQ ID NOs: 3-5 and optionally has an equivalent or higher yield, reaction rate, e.g. rate constant, temperature and/or buffer range relative to a polypeptide (peptide tag binding partner) having an amino acid sequence as set forth in SEQ ID NO: 1.

In some further embodiments, the variant polypeptide of the invention comprises the residues specified above, optionally the substitutions specified above and a deletion of methionine at position 17 of SEQ ID NO: 1, and retains the functional characteristics defined above, i.e. it results in a polypeptide (peptide tag binding partner) capable of spontaneously forming an isopeptide bond with a peptide tag comprising or consisting of an amino acid sequence as set forth in one of SEQ ID NOs: 3-5 and optionally has an equivalent or higher yield, reaction rate, e.g. rate constant, temperature and/or buffer range relative to a polypeptide (peptide tag binding partner) having an amino acid sequence as set forth in SEQ ID NO: 1.

Alternatively viewed, any modification or combination of modifications (preferably substitutions) may be made to SEQ ID NO: 2 to produce a variant polypeptide (peptide tag binding partner) of the invention, provided that the variant polypeptide (peptide tag binding partner) comprises a lysine residue at a position equivalent to position 10 of SEQ ID NO: 2 and a glutamic acid residue at a position equivalent to position 56 of SEQ ID NO: 2 and at least one (preferably 2 or 3) other amino acid residue(s) at positions equivalent to positions 70, 82 and 87, optionally one or both amino acid residue(s) at positions equivalent to positions 68 and 76, further optionally one or more (preferably 2, 3 or 4) amino acid residue(s) at positions equivalent to positions 16, 41, 84 and 92 of SEQ ID NO: 2, and further optionally one or more (preferably 2, 3, 4 or 5) amino acid residue(s) at positions equivalent to positions 13, 29, 48, 62 and 65 of SEQ ID NO: 2 as defined above and retains the functional characteristics defined above, i.e. it results in a polypeptide (peptide tag binding partner) capable of spontaneously forming an isopeptide bond with a peptide tag comprising or consisting of an amino acid sequence as set forth in one of SEQ ID NOs: 3-5 and optionally has an equivalent or higher yield, reaction rate, e.g. rate constant, temperature and/or buffer range relative to a polypeptide (peptide tag binding partner) having an amino acid sequence as set forth in SEQ ID NO: 2.

In some embodiments, the truncated variant polypeptide (peptide tag binding partner) of the invention comprises the residues specified above and one or more (2, 3, 4 or 5) of the following substitutions: K31Q, V42D, Y48S, T67L and E75P (relative to SEQ ID NO: 2), and retains the functional characteristics defined above, i.e. it results in a polypeptide (peptide tag binding partner) capable of spontaneously forming an isopeptide bond with a peptide tag comprising or consisting of an amino acid sequence as set forth in one of SEQ ID NOs: 3-5 and optionally has an equivalent or higher yield, reaction rate, e.g. rate constant, temperature and/or buffer range relative to a polypeptide (peptide tag binding partner) having an amino acid sequence as set forth in SEQ ID NO: 2.

An equivalent position in the peptide tag disclosed herein is preferably determined by reference to the amino acid sequence of SEQ ID NO: 3 or 6. An equivalent position in the polypeptide (peptide tag binding partner) of the invention is determined by reference to the amino acid sequence of SEQ ID NO: 1 or 2. The homologous or corresponding position can be readily deduced by lining up the sequence of the homologue (mutant, variant or derivative) peptide tag and the sequence of SEQ ID NO: 3 or 6 or the sequence of the homologue (mutant, variant or derivative) polypeptide (peptide tag binding partner) and the sequence of SEQ ID NO: 1 or 2 based on the homology or identity between the sequences, for example using a BLAST algorithm.

The terms "tag" and "peptide tag" as used herein generally refer to a peptide or oligopeptide.

The term "peptide tag binding partner", "binding partner" or "catcher" as used herein generally refers to a polypeptide or protein.

In this respect, there is no standard definition regarding the size boundaries between what is meant by peptide. Typically a peptide may be viewed as comprising between 2-39 amino acids. Accordingly, a polypeptide may be viewed as comprising at least 40 amino acids, preferably at least 50, 60, 70, 80, 90, 100 or 110 amino acids.

Thus, in preferred embodiments a peptide tag as defined herein may be viewed as comprising at least 12 amino acids, e.g. 12-39 amino acids, such as e.g. 13-35, 14-34, 15-33, 16-31, 17-30 amino acids in length, e.g. it may comprise or consist of 12, 13, 14, 15, 16, 17, 18, 19 or 20 amino acids.

A polypeptide of the invention (a peptide tag binding partner, binding partner or "catcher") as defined herein may be viewed as comprising at least 80 amino acids, e.g. 80-150 amino acids, such as e.g. 80-140, 80-130, 80-120 amino acids in length, e.g. it may comprise or consist of 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119 or 120 amino acids.

As discussed above, two-part linkers (e.g. tag and catcher systems or pairs, i.e. cognate pairs) have a large number of utilities and the polypeptide (peptide tag binding partner) of the invention and its cognate peptide tag(s) (e.g. SEQ ID NOs: 3-6) find particular utility in conjugating (i.e. joining or linking) two molecules or components via an isopeptide bond. For instance, the peptide tag and polypeptide (peptide tag binding partner) may be separately conjugated or fused to molecules or components of interest and subsequently contacted together under conditions suitable to allow the spontaneous formation of an isopeptide bond between the peptide tag and polypeptide (peptide tag binding partner), thereby joining (i.e. linking or conjugating) the molecules or components via an isopeptide bond.

Thus, in some embodiments, the invention may be seen to provide the use of a peptide (peptide tag) and polypeptide (peptide tag binding partner) pair as defined herein to conjugate two molecules or components via an isopeptide bond,
  wherein said molecules or components conjugated via an isopeptide bond comprise:
  a) a first molecule or component comprising (e.g. conjugated or fused to) a polypeptide (peptide tag binding partner) of the invention as defined herein; and
  b) a second molecule or component comprising (e.g. conjugated or fused to) a peptide (peptide tag) as defined herein.

It will be evident that the use of the peptide tag and polypeptide (peptide tag binding partner) pair (i.e. two-part linker) described above comprises contacting said first and second molecules under conditions suitable to enable (e.g. promote or facilitate) the spontaneous formation of an isopeptide bond between said peptide tag and polypeptide (peptide tag binding partner) as described above.

Alternatively viewed, the invention provides a process for conjugating two molecules or components via an isopeptide bond comprising:
  a) providing a first molecule or component comprising (e.g. conjugated or fused to) a polypeptide (peptide tag binding partner) of the invention as defined herein;
  b) providing a second molecule or component comprising (e.g. conjugated or fused to) a peptide (peptide tag) as defined herein;
  c) contacting said first and second molecules or components under conditions that enable (e.g. promote or facilitate) the spontaneous formation of an isopeptide bond between the peptide and polypeptide as described above, thereby conjugating said first molecule or component to said second molecule or component via an isopeptide bond to form a complex.

The terms "conjugating" or "linking" in the context of the present invention with respect to connecting two or more molecules or components to form a complex refers to joining or conjugating said molecules or components, e.g. proteins, via a covalent bond, particularly an isopeptide bond which forms between the peptide tag and polypeptide (peptide tag binding partner) that are incorporated in, or fused to, said molecules or components, e.g. proteins (e.g. the peptide tag and polypeptide (peptide tag binding partner) may form domains of proteins to be conjugated or linked together).

As mentioned above, in some embodiments, the peptide tag disclosed herein and/or polypeptide (peptide tag binding partner) of the invention are fused or conjugated to other molecules or to other components or entities. Such molecules or components (i.e. entities) may be a nucleic acid molecule, protein (e.g. antibody or antigen-binding fragment thereof), peptide, small-molecule organic compound, fluorophore, metal-ligand complex, polysaccharide, nanoparticle, 2D monolayer (e.g. graphene), nanotube, polymer, cell, virus, virus-like particle or any combination of these. In some embodiments the component or entity to which the peptide tag and/or polypeptide (peptide tag binding partner) is fused or conjugated is a solid support, i.e. solid substrate or solid phase, as defined below.

Thus, alternatively viewed, the invention provides a nucleic acid molecule, protein (e.g. antibody or antigen-binding fragment thereof), peptide, small-molecule organic compound, fluorophore, metal-ligand complex, polysaccharide, nanoparticle, 2D monolayer (e.g. graphene), nanotube, polymer, cell, virus, virus-like particle or any combination thereof or solid support fused or conjugated to a peptide tag and/or polypeptide (peptide tag binding partner) of the invention.

The cell may be a prokaryotic or eukaryotic cell. In some embodiments, the cell is a prokaryotic cell, e.g. a bacterial cell. In some embodiments, the cell is a eukaryotic cell, such as an animal cell, e.g. a human cell.

In some embodiments, the peptide tag and/or polypeptide (peptide tag binding partner) may be conjugated or fused to a compound or molecule which has a therapeutic or prophylactic effect, e.g. an antibiotic, antiviral, vaccine, antitumour agent, e.g. a radioactive compound or isotope, cytokines, toxins, oligonucleotides and nucleic acids encoding genes or nucleic acid vaccines.

In some embodiments, the peptide tag and/or polypeptide (peptide tag binding partner) may be conjugated or fused to a label, e.g. a radiolabel, a fluorescent label, luminescent label, a chromophore label as well as to substances and enzymes which generate a detectable substrate, e.g. horseradish peroxidase, luciferase or alkaline phosphatase. This detection may be applied in numerous assays where antibodies are conventionally used, including Western blotting/immunoblotting, histochemistry, enzyme-linked immunosorbent assay (ELISA), or flow cytometry (FACS) formats. Labels for magnetic resonance imaging, positron emission tomography probes and boron 10 for neutron capture therapy may also be conjugated to the peptide tag and/or polypeptide (peptide tag binding partner) of the invention. Particularly, the peptide tag and/or polypeptide (peptide tag binding partner) may be fused or produced with another peptide, for example His tag, and/or may be fused or produced with another protein, for example with the purpose of enhancing recombinant protein expression by fusing to Maltose Binding Protein.

In some embodiments, it may be useful to introduce a cysteine residue into the polypeptide of the invention to couple the polypeptide to another molecule or component, such as a label, e.g. a fluorescent label, or a solid substrate. For instance, the introduction of a cysteine residue would allow the polypeptide to be coupled to another molecule or component, such as a label, e.g. a fluorescent label, containing a maleimide functional group.

In some particular embodiments, the polypeptide variants defined above may additionally comprise a cysteine at a position equivalent to position 49 or 55 in SEQ ID NO: 1 (preferably a position equivalent to position 49) or position 28 or 34 in SEQ ID NO: 2 (preferably a position equivalent to position 28). Thus, in some embodiments, the polypeptide of the invention comprises an amino acid sequence as set forth in SEQ ID NO: 12 or 13.

In a particularly useful embodiment, the peptide tag and/or polypeptide (peptide tag binding partner) is fused or conjugated with another peptide or polypeptide. For instance, the peptide tag and/or polypeptide (peptide tag binding partner) may be produced as part of another peptide or polypeptide using recombinant techniques as discussed below, i.e. as a recombinant or synthetic protein or polypeptide. In embodiments in which the peptide or polypeptide is fused or conjugated to another peptide or polypeptide, the peptide or polypeptide is not peptide or polypeptide from which the peptide tag or polypeptide of the invention is derived (e.g. the peptide or polypeptide is not an isopeptide protein, i.e. the isopeptide protein from which the polypeptide of the invention is derived (the CnaB2 domain of the *Streptococcus pyogenes* FbaB protein)).

It will be evident that the peptide tag disclosed herein and/or the polypeptide (peptide tag binding partner) of the invention may be fused to any protein or polypeptide. The protein may be derived or obtained from any suitable source. For instance, the protein may be in vitro translated or purified from biological and clinical samples, e.g. any cell or tissue sample of an organism (eukaryotic, prokaryotic), or any body fluid or preparation derived therefrom, as well as samples such as cell cultures, cell preparations, cell lysates etc. Proteins may be derived or obtained, e.g. purified from environmental samples, e.g. soil and water samples or food samples are also included. The samples may be freshly prepared or they may be prior-treated in any convenient way e.g. for storage.

As noted above, in a preferred embodiment, the peptide or protein fused to the peptide tag disclosed herein and/or polypeptide of the invention may be produced recombinantly and thus the nucleic acid molecules encoding said recombinant proteins may be derived or obtained from any suitable source, e.g. any viral or cellular material, including all prokaryotic or eukaryotic cells, viruses, bacteriophages, mycoplasmas, protoplasts and organelles. Such biological material may thus comprise all types of mammalian and non-mammalian animal cells, plant cells, algae including blue-green algae, fungi, bacteria, protozoa, viruses etc. In some embodiments, the proteins may be synthetic proteins. For example, the peptide and polypeptide (proteins) disclosed herein may be produced by chemical synthesis, such as solid-phase peptide synthesis.

The position of the peptide tag and/or polypeptide (peptide tag binding partner) within a recombinant or synthetic protein is not particularly important. Thus, in some embodiments the peptide tag and/or polypeptide (peptide tag binding partner) may be located at the N-terminus or C-terminus of the recombinant or synthetic polypeptide. In some embodiments, the peptide tag and/or polypeptide (peptide tag binding partner) may be located internally within the recombinant or synthetic polypeptide. Thus, in some embodiments the peptide tag and/or polypeptide (peptide tag binding partner) may be viewed as an N-terminal, C-terminal or internal domain of the recombinant or synthetic polypeptide.

In some preferred embodiments, the polypeptide (peptide tag binding partner) is preferably located at the N-terminus or C-terminus of the recombinant or synthetic polypeptide. Thus, in some embodiments the polypeptide (peptide tag binding partner) may be viewed as an N-terminal or C-terminal domain of the recombinant or synthetic polypeptide.

In some embodiments, it may be useful to include one or more spacers, e.g. a peptide spacer, between the peptide or polypeptide to be joined or conjugated with peptide tag and/or polypeptide (peptide tag binding partner). Thus, the peptide, oligopeptide or polypeptide and peptide tag and/or polypeptide (peptide tag binding partner) may be linked directly to each other or they may be linked indirectly by means of one or more spacer sequences. Thus, a spacer sequence may interspace or separate two or more individual parts of the recombinant or synthetic polypeptide. In some embodiments, a spacer may be N-terminal or C-terminal to the peptide tag and/or polypeptide (peptide tag binding partner). In some embodiments, spacers may be at both sides of the peptide tag and/or polypeptide (peptide tag binding partner).

The precise nature of the spacer sequence is not critical and it may be of variable length and/or sequence, for example it may have 1-40, more particularly 2-20, 1-15, 1-12, 1-10, 1-8, or 1-6 residues, e.g. 6, 7, 8, 9, 10 or more residues. By way of representative example the spacer sequence, if present, may have 1-15, 1-12, 1-10, 1-8 or 1-6 residues etc. The nature of the residues is not critical and they may for example be any amino acid, e.g. a neutral amino acid, or an aliphatic amino acid, or alternatively they may be hydrophobic, or polar or charged or structure-forming e.g. proline. In some preferred embodiments, the linker is a serine and/or glycine-rich sequence.

Exemplary spacer sequences thus include any single amino acid residue, e.g. S, G, L, V, P, R, H, M, A or E or a di-, tri- tetra- penta- or hexa-peptide composed of one or more of such residues.

Thus, in some embodiments, the invention provides a recombinant or synthetic polypeptide comprising a polypeptide (peptide tag binding partner) of the invention as defined above, i.e. a recombinant or synthetic polypeptide comprising a peptide or polypeptide (e.g. a heterologous peptide or polypeptide, i.e. a peptide or polypeptide that is not normally associated with the polypeptide of the invention, e.g. from a different organism) fused to a polypeptide (peptide tag binding partner) of the invention. The recombinant or synthetic polypeptide optionally comprises a spacer as defined above.

The recombinant or synthetic polypeptide of the invention may also comprise purification moieties or tags to facilitate its purification (e.g. prior to use in the methods and uses of the invention discussed below). Any suitable purification moiety or tag may be incorporated into the polypeptide and such moieties are well known in the art. For instance, in some embodiments, the recombinant or synthetic polypeptide may comprise a peptide purification tag or moiety, e.g. a His-tag or C-tag sequence. Such purification moieties or tags may be incorporated at any position within the polypeptide. In some preferred embodiments, the purification moiety is located at or towards (i.e. within 5, 10, 15, 20 amino acids of) the N- or C-terminus of the polypeptide.

As noted above, an advantage of the present invention arises from the fact that the peptide tag and/or polypeptide (peptide tag binding partner) of the two-part linker incorporated in a peptide or polypeptide (e.g. the recombinant or synthetic polypeptides of the invention) may be completely genetically encoded. Thus, in a further aspect, the invention provides a nucleic acid molecule encoding a polypeptide (peptide tag binding partner) or recombinant or synthetic polypeptide as defined above.

In some embodiments, the nucleic acid molecule is codon-optimised for expression in a host cell. Thus, in some embodiments, the nucleic acid molecule is codon optimised for expression in a bacterial cell, such as E. coli, e.g. a nucleotide sequence as set forth in SEQ ID NO: 9. In some embodiments, the nucleic acid molecule is codon optimised for expression in a mammalian cell, such as a human cell, e.g. an HEK cell, e.g. a nucleotide sequence as set forth in SEQ ID NO: 10.

In some embodiments, the nucleic acid molecule encoding a polypeptide binding partner defined above comprises a nucleotide sequence as set forth in SEQ ID NO: 9 or 10, or a nucleotide sequence with at least 80% sequence identity to a sequence as set forth in SEQ ID NO: 9 or 10.

Preferably, the nucleic acid molecule above is at least 85, 90, 95, 96, 97, 98, 99 or 100% identical to the sequence to which it is compared.

Nucleic acid sequence identity may be determined by, e.g. FASTA Search using GCG packages, with default values and a variable pamfactor, and gap creation penalty set at 12.0 and gap extension penalty set at 4.0 with a window of 6 nucleotides. Preferably said comparison is made over the full length of the sequence, but may be made over a smaller window of comparison, e.g. less than 600, 500, 400, 300, 200, 100 or 50 contiguous nucleotides.

The nucleic acid molecules of the invention may be made up of ribonucleotides and/or deoxyribonucleotides as well as synthetic residues, e.g. synthetic nucleotides, that are capable of participating in Watson-Crick type or analogous base pair interactions. Preferably, the nucleic acid molecule is DNA or RNA.

The nucleic acid molecules described above may be operatively linked to an expression control sequence, or a recombinant DNA cloning vehicle or vector containing such a recombinant DNA molecule. This allows cellular expression of the peptides and polypeptides of the invention as a gene product, the expression of which is directed by the gene(s) introduced into cells of interest. Gene expression is directed from a promoter active in the cells of interest and may be inserted in any form of linear or circular nucleic acid (e.g. DNA) vector for incorporation in the genome or for independent replication or transient transfection/expression. Suitable transformation or transfection techniques are well described in the literature. Alternatively, the naked nucleic acid (e.g. DNA or RNA, which may include one or more synthetic residues, e.g. base analogues) molecule may be introduced directly into the cell for the production of polypeptides of the invention. Alternatively the nucleic acid may be converted to mRNA by in vitro transcription and the relevant proteins may be generated by in vitro translation.

Appropriate expression vectors include appropriate control sequences such as for example translational (e.g. start and stop codons, ribosomal binding sites) and transcriptional control elements (e.g. promoter-operator regions, termination stop sequences) linked in matching reading frame with the nucleic acid molecules of the invention. Appropriate vectors may include plasmids and viruses (including both bacteriophage and eukaryotic viruses). Suitable viral vectors include baculovirus and also adenovirus, adeno-associated virus, lentivirus, herpes and vaccinia/pox viruses. Many other viral vectors are described in the art. Examples of suitable vectors include bacterial and mammalian expression vectors pGEX-KG, pEF-neo and pEF-HA.

As noted above, the recombinant or synthetic polypeptide of the invention may comprise additional sequences (e.g. peptide/polypeptides tags to facilitate purification of the polypeptide) and thus the nucleic acid molecule may conveniently be fused with DNA encoding an additional peptide or polypeptide, e.g. His-tag, maltose-binding protein etc., to produce a fusion protein on expression.

Thus viewed from a further aspect, the present invention provides a vector, preferably an expression vector, comprising a nucleic acid molecule as defined above.

Other aspects of the invention include methods for preparing recombinant nucleic acid molecules according to the invention, comprising inserting the nucleic acid molecule of the invention encoding the polypeptide (peptide tag binding partner) of the invention into vector nucleic acid.

Nucleic acid molecules of the invention, preferably contained in a vector, may be introduced into a cell by any appropriate means. Suitable transformation or transfection techniques are well described in the literature. Numerous techniques are known and may be used to introduce such vectors into prokaryotic or eukaryotic cells for expression. Preferred host cells for this purpose include insect cell lines, yeast, mammalian cell lines or *E. coli*, such as strain BL21 (DE3). The invention also extends to transformed or transfected prokaryotic or eukaryotic host cells containing a nucleic acid molecule, particularly a vector as defined above.

Thus, in another aspect, there is provided a recombinant host cell containing a nucleic acid molecule and/or vector as described above.

By "recombinant" is meant that the nucleic acid molecule and/or vector has been introduced into the host cell. The host cell may or may not naturally contain an endogenous copy of the nucleic acid molecule, but it is recombinant in that an exogenous or further endogenous copy of the nucleic acid molecule and/or vector has been introduced.

A further aspect of the invention provides a method of preparing a polypeptide (peptide tag binding partner) of the invention or recombinant polypeptide as hereinbefore defined, which comprises culturing a host cell containing a nucleic acid molecule as defined above, under conditions whereby said nucleic acid molecule encoding said polypeptide (peptide tag binding partner) is expressed and recovering said molecule (polypeptide (peptide tag binding partner)) thus produced. The expressed polypeptide (peptide tag binding partner) forms a further aspect of the invention.

In some embodiments, the peptide tag disclosed herein and/or polypeptide (peptide tag binding partner) of the invention, or for use in the method and uses of the invention, may be generated synthetically, e.g. by ligation of amino acids or smaller synthetically generated peptides, or more conveniently by recombinant expression of a nucleic acid molecule encoding said polypeptide as described hereinbefore.

Nucleic acid molecules of the invention may be generated synthetically by any suitable means known in the art.

Thus, the peptide tag disclosed herein and/or polypeptide (peptide tag binding partner) of the invention may be an isolated, purified, recombinant or synthesised peptide tag or polypeptide.

The term "polypeptide" is used herein interchangeably with the term "protein". As noted above, the term polypeptide or protein typically includes any amino acid sequence comprising at least 40 consecutive amino acid residues, e.g. at least 50, 60, 70, 80, 90, 100, 150 amino acids, such as 40-1000, 50-900, 60-800, 70-700, 80-600, 90-500, 100-400 amino acids.

Similarly, the nucleic acid molecules of the invention may be an isolated, purified, recombinant or synthesised nucleic acid molecule.

Thus, alternatively viewed, the polypeptides and nucleic acid molecules of the invention preferably are non-native, i.e. non-naturally occurring, molecules.

Standard amino acid nomenclature is used herein. Thus, the full name of an amino acid residue may be used interchangeably with one letter code or three letter abbreviations. For instance, lysine may be substituted with K or Lys, isoleucine may be substituted with I or Ile, and so on. Moreover, the terms aspartate and aspartic acid, and glutamate and glutamic acid are used interchangeably herein and may be replaced with Asp or D, or Glu or E, respectively.

Whilst it is envisaged that the peptide tag disclosed herein and polypeptide (peptide tag binding partner) of, and for use in, the invention may be produced recombinantly, and this is a preferred embodiment of the invention, it will be evident that the peptide tag disclosed herein and polypeptide (peptide tag binding partner) of the invention may be conjugated to proteins or other entities, e.g. molecules or components, as defined above by other means. In other words, the peptide tag or polypeptide (peptide tag binding partner) and other molecule, component or entity, e.g. protein, may be produced separately by any suitable means, e.g. recombinantly, and subsequently conjugated (joined) to form a peptide tag-other component conjugate or polypeptide (peptide tag binding partner)-other component conjugate that can be used in the methods and uses of the invention. For instance, the peptide tag disclosed herein and/or polypeptide (peptide tag binding partner) of the invention may be produced synthetically or recombinantly, as described above, and conjugated to another component, e.g. a protein via a non-peptide linker or spacer, e.g. a chemical linker or spacer.

Thus, in some embodiments, the peptide tag and/or polypeptide (peptide tag binding partner) and other component, e.g. protein, may be joined together either directly through a bond or indirectly through a linking group. Where linking groups are employed, such groups may be chosen to provide for covalent attachment of the peptide tag or polypeptide (peptide tag binding partner) and other entity, e.g. protein, through the linking group. Linking groups of interest may vary widely depending on the nature of the other entity, e.g. protein. The linking group, when present, is in many embodiments biologically inert.

Many linking groups are known to those of skill in the art and find use in the invention. In representative embodiments, the linking group is generally at least about 50 daltons, usually at least about 100 daltons and may be as large as 1000 daltons or larger, for example up to 1000000 daltons if the linking group contains a spacer, but generally will not exceed about 500 daltons and usually will not exceed about 300 daltons. Generally, such linkers will comprise a spacer group terminated at either end with a reactive functionality capable of covalently bonding to the peptide tag or binding partner and other molecule or component, e.g. protein.

Spacer groups of interest may include aliphatic and unsaturated hydrocarbon chains, spacers containing heteroatoms such as oxygen (ethers such as polyethylene glycol) or nitrogen (polyamines), peptides, carbohydrates, cyclic or acyclic systems that may possibly contain heteroatoms. Spacer groups may also be comprised of ligands that bind to metals such that the presence of a metal ion coordinates two or more ligands to form a complex. Specific spacer elements include: 1,4-diaminohexane, xylylenediamine, terephthalic acid, 3,6-dioxaoctanedioic acid, ethylenediamine-N,N-diacetic acid, 1,1'-ethylenebis(5-oxo-3-pyrrolidinecarboxylic acid), 4,4'-ethylenedipiperidine, oligoethylene glycol and polyethylene glycol. Potential reactive functionalities include nucleophilic functional groups (amines, alcohols, thiols, hydrazides), electrophilic functional groups (aldehydes, esters, vinyl ketones, epoxides, isocyanates, maleimides), functional groups capable of cycloaddition reactions, forming disulfide bonds, or binding to metals. Specific examples include primary and secondary amines, hydroxamic acids, N-hydroxysuccinimidyl esters, N-hydroxysuccinimidyl carbonates, oxycarbonylimidazoles, nitrophenylesters, trifluoroethyl esters, glycidyl ethers, vinylsulfones, and maleimides. Specific linker groups that may find use in the peptide tag/polypeptide binding partner conjugates include heterofunctional compounds, such as azidobenzoyl hydrazide, N-[4-(p-azidosalicylamino)butyl]-3'-[2'-pyridyldithio]propionamid), bis-sulfosuccinimidyl suberate, dimethyladipimidate, disuccinimidyltartrate, N-maleimidobutyryloxysuccinimide ester, N-hydroxy sulfosuccinimidyl-4-azidobenzoate, N-succinimidyl [4-azidophenyl]-1,3'-dithiopropionate, N-succinimidyl [4-iodoacetyl]aminobenzoate, glutaraldehyde, and succinimidyl-4-[N-maleimidomethyl]cyclohexane-1-carboxylate, 3-(2-pyridyldithio)propionic acid N-hydroxysuccinimide ester (SPDP), 4-(N-maleimidomethyl)-cyclohexane-1-carboxylic acid N-hydroxysuccinimide ester (SMCC), and the like. For instance, a spacer may be formed with an azide reacting with an alkyne or formed with a tetrazine reacting with a transcyclooctene or a norbornene.

In some embodiments, it may be useful to modify one or more residues in the peptide tag and/or polypeptide (peptide tag binding partner) to facilitate the conjugation of these molecules and/or to improve the stability of the peptide tag and/or polypeptide (peptide tag binding partner). Thus, in some embodiments, the peptide tag disclosed herein or polypeptide (peptide tag binding partner) of, or for use in, the invention may comprise unnatural or non-standard amino acids.

In some embodiments, the peptide tag disclosed herein or polypeptide (peptide tag binding partner) of, or for use in, the invention may comprise one or more, e.g. at least 1, 2, 3, 4, 5 non-conventional amino acids, such as 10, 15, 20 or more non-conventional, i.e. amino acids which possess a side chain that is not coded for by the standard genetic code, termed herein "non-coded amino acids". Such amino acids are well known in the art and may be selected from amino acids which are formed through metabolic processes such as ornithine or taurine, and/or artificially modified amino acids such as 9H-fluoren-9-ylmethoxycarbonyl (Fmoc), (tert)-(B)utyl (o)xy (c)arbonyl (Boc), 2,2,5,7,8-pentamethylchroman-6-sulphonyl (Pmc) protected amino acids, or amino acids having the benzyloxy-carbonyl (Z) group.

Examples of non-standard or structural analogue amino acids which may be used in the peptide tag or polypeptide (peptide tag binding partner) of, and for use in, the invention are D amino acids, amide isosteres (such as N-methyl amide, retro-inverse amide, thioamide, thioester, phosphonate, ketomethylene, hydroxymethylene, fluorovinyl, (E)-vinyl, methyleneamino, methylenethio or alkane), L-N methylamino acids, D-α methylamino acids, D-N-methylamino acids. Further non-standard amino acids which may be used in the peptide tag disclosed herein and/or polypeptide of, and for use in, the invention are disclosed in Willis and Chin, Nat Chem. 2018; 10(8):831-837, in Table 1 of WO2018/189517 and WO2018/197854, all of which are herein incorporated by reference.

In some embodiments, it may be useful to fuse or conjugate the peptide tag disclosed herein and/or polypeptide (peptide tag binding partner) of the invention to a solid substrate (i.e. a solid phase or solid support) and it will be evident that this may be achieved in any convenient way. Thus, the manner or means of immobilisation and the solid support may be selected, according to choice, from any number of immobilisation means and solid supports as are widely known in the art and described in the literature. Thus, the peptide tag and/or polypeptide (peptide tag binding partner) may be directly bound to the support, for example via a domain or moiety of the peptide tag or polypeptide (peptide tag binding partner) (e.g. chemically cross-linked). In some embodiments, the peptide tag or polypeptide (peptide tag binding partner) may be bound indirectly by means of a linker group, or by an intermediary binding group(s) (e.g. by means of a biotin-streptavidin interaction). Thus, the peptide tag or polypeptide (peptide tag binding partner) may be covalently or non-covalently linked to the solid support. The linkage may be a reversible (e.g. cleavable) or irreversible linkage. Thus, in some embodiments, the linkage may be cleaved enzymatically, chemically, or with light, e.g. the linkage may be a light-sensitive linkage.

Thus, in some embodiments, a peptide tag or polypeptide (peptide tag binding partner) may be provided with means for immobilisation (e.g. an affinity binding partner, e.g. biotin or a hapten, capable of binding to its binding partner, i.e. a cognate binding partner, e.g. streptavidin or an antibody) provided on the support. In some embodiments, the interaction between the peptide tag or polypeptide (peptide tag binding partner) and the solid support must be robust enough to allow for washing steps, i.e. the interaction between the peptide tag or polypeptide (peptide tag binding partner) and solid support is not disrupted (significantly disrupted) by the washing steps. For instance, it is preferred that with each washing step, less than 5%, preferably less than 4, 3, 2, 1, 0.5 or 0.1% of the peptide tag or polypeptide (peptide tag binding partner) is removed or eluted from the solid phase.

The solid support (phase or substrate) may be any of the well-known supports or matrices which are currently widely used or proposed for immobilisation, separation etc. These may take the form of particles (e.g. beads which may be magnetic, para-magnetic or non-magnetic), sheets, gels, filters, membranes, fibres, capillaries, slides, arrays or microtitre strips, tubes, plates or wells etc.

The support may be made of glass, silica, latex or a polymeric material, e.g. a polysaccharide polymer material, such as agarose (e.g. sepharose). Suitable are materials presenting a high surface area for binding of the polypeptide of the invention. Such supports may have an irregular surface and may be for example porous or particulate, e.g. particles, fibres, webs, sinters or sieves. Particulate materials, e.g. beads are useful due to their greater binding capacity, particularly polymeric beads.

Conveniently, a particulate solid support used according to the invention will comprise spherical beads. The size of the beads is not critical, but they may for example be of the order of diameter of at least about 1 µm and preferably at least about 2 µm, 5 µm, 10 µm or 20 µm and have a maximum diameter of preferably not more than about 500 µm, and e.g. not more than about 100 µm.

Monodisperse particles, that is those which are substantially uniform in size (e.g. size having a diameter standard deviation of less than 5%) have the advantage that they provide very uniform reproducibility of reaction. Representative monodisperse polymer particles may be produced by the technique described in U.S. Pat. No. 4,336,173.

However, to aid manipulation and separation, magnetic beads are advantageous. The term "magnetic" as used herein means that the support is capable of having a magnetic moment imparted to it when placed in a magnetic field, and thus is displaceable under the action of that field. In other words, a support comprising magnetic particles may readily be removed by magnetic aggregation, which provides a quick, simple and efficient way of separating the particles following the isopeptide bond formation steps.

In some embodiments, the solid support is a resin, e.g. an amylose resin.

In a further embodiment, the invention provides a kit, particularly a kit for use in the processes and uses of the invention, i.e. for conjugating two molecules or components via an isopeptide bond, wherein two of the molecules or components in the complex are conjugated via an isopeptide bond, wherein said kit comprises:
  (a) a polypeptide (peptide tag binding partner) as defined above, optionally conjugated or fused to a molecule or component, e.g. a protein such as a recombinant or synthetic polypeptide comprising a polypeptide (peptide tag binding partner) as defined above; and
  (b) a peptide (peptide tag) as defined above, optionally conjugated or fused to a molecule or component, e.g. a protein; and/or
  (c) a nucleic acid molecule, particularly a vector, encoding a polypeptide (peptide tag binding partner) as defined in (a); and
  (d) a nucleic acid molecule, particularly a vector, encoding a peptide tag as defined in (b).

It will be evident that the peptide tag(s) disclosed herein and the polypeptide (peptide tag binding partner) of the invention have a wide range of utilities. Alternatively viewed, the peptide tag disclosed herein and the polypeptide (peptide tag binding partner) of the invention may be employed in a variety of industries.

For instance, in some embodiments, the peptide tag(s) disclosed herein and the polypeptide (peptide tag binding partner) of the invention may find utility in targeting fluorescent or other biophysical probes or labels to specific proteins. In this respect, the protein of interest may be modified to incorporate a peptide tag (e.g. one of SEQ ID NOs: 3-6), as discussed above, and the fluorescent or other biophysical probe or label may be fused or conjugated to the polypeptide (peptide tag binding partner, e.g. SEQ ID NO: 1 or 2). The modified protein and probe or label may be contacted together under conditions suitable to allow the spontaneous formation of an isopeptide bond between the peptide tag and polypeptide (peptide tag binding partner), thereby labelling the protein with the label or probe via an isopeptide bond. For instance, the labelled polypeptide of the invention may find utility in an antibody-free Western blot, i.e. where the labelled polypeptide is used to detect a polypeptide containing a SpyTag peptide (e.g. a peptide having an amino acid sequence as set forth in one of SEQ ID NOs: 3-6) without the need for a separate labelled antibody.

In some embodiments, the peptide tag(s) disclosed herein and polypeptide (peptide tag binding partner) of the invention may find utility in protein immobilisation for proteomics. In this respect, the proteins of interest may be modified to incorporate a peptide tag (e.g. one of SEQ ID NOs: 3-6) and a solid substrate may be fused or conjugated to the polypeptide (peptide tag binding partner, e.g. SEQ ID NO: 1 or 2). The modified proteins and solid substrate may be contacted together under conditions suitable to allow the spontaneous formation of an isopeptide bond between the peptide tag and polypeptide (peptide tag binding partner), thereby immobilising the proteins on the solid substrate via an isopeptide bond. It will be evident that the peptide tag(s) disclosed herein and polypeptide (peptide tag binding partner) of the invention may be used to simultaneously immobilise multiple proteins on a solid phase/substrate, i.e. in a multiplex reaction.

In still further embodiments, the peptide tag(s) disclosed herein and polypeptide (peptide tag binding partner) of the invention may find utility in conjugation of antigens to virus-like particles, viruses, bacteria or multimerisation scaffolds for vaccination. For instance, the production of virus-like particles, viruses or bacteria that display the polypeptide (peptide tag binding partner) of the invention (e.g. SEQ ID NO: 1 or 2) on the surface would facilitate the conjugation of antigens comprising the peptide tag (e.g. one of SEQ ID NOs: 3-6) to their surface via an isopeptide bond. In this respect, antigen multimerisation gives rise to greatly enhanced immune responses. Thus, in some embodiments, the molecule or component fused to the polypeptide of the invention is a viral capsid protein and/or the molecule or component fused to the peptide tag is an antigen, e.g. an antigen associated with a particular disease, e.g. infection, an autoimmue disease, allergy or cancer.

In other embodiments, the peptide tag(s) disclosed herein and polypeptide (peptide tag binding partner) of the invention may be used to cyclise an enzyme, e.g. by fusing a peptide tag and binding partner to each end of the enzyme and subsequently allowing the spontaneous formation of the isopeptide bond between the peptide tag and polypeptide (peptide tag binding partner). In this respect, cyclisation of enzymes has been shown to increase enzyme resilience.

In particular, cyclisation of enzymes or enzyme polymers (fusion proteins) may improve the thermostability of the protein or protein units in the enzyme polymer. In this respect, enzymes are valuable tools in many processes but are unstable and hard to recover. Enzyme polymers have greater stability to temperature, pH and organic solvents and there is an increased desire to use enzyme polymers in industrial processes. However, enzyme polymer generation commonly uses a glutaraldehyde non-specific reaction and this will damage or denature (i.e. reduce the activity of) many potentially useful enzymes. Site-specific linkage of proteins into chains (polymers) through isopeptide bonds using the peptide tag(s) disclosed herein and polypeptide (peptide tag binding partner) of the present invention is expected to enhance enzyme resilience, such as in diagnostics or enzymes added to animal feed. In particularly preferred embodiments, enzymes may be stabilised by cyclisation, as discussed above.

The peptide tag(s) disclosed herein and polypeptide (peptide tag binding partner) of the invention could also be used to link multiple enzymes into pathways to promote metabolic efficiency, as described in WO 2016/193746. In this respect, enzymes often come together to function in pathways inside cells and traditionally it has been difficult to connect multiple enzymes together outside cells (in vitro). Thus, the peptide tag(s) disclosed herein and polypeptide (peptide tag binding partner) of the invention could be used to couple or conjugate enzymes to produce fusion proteins and therefore enhance activity of multi-step enzyme pathways, which could be useful in a range of industrial conversions and for diagnostics.

The peptide tag(s) disclosed herein and polypeptide (peptide tag binding partner) of the invention will also find utility in the production of antibody polymers. In this respect, antibodies are one of the most important class of pharmaceuticals and are often used attached to surfaces. However, antigen mixing in a sample, and therefore capture of said antigen in said sample, are inefficient near surfaces. By extending chains of antibodies, it is anticipated that capture efficiency will be improved. This will be especially valuable in circulating tumour cell isolation, which at present is one of the most promising ways to enable early cancer diagnosis.

In a still further embodiment, the peptide tag(s) disclosed herein and polypeptide (peptide tag binding partner) of the invention may find utility in the production of drugs for activating cell signalling. In this respect, many of the most effective ways to activate cellular function are through protein ligands. However, in nature a protein ligand will usually not operate alone but with a specific combination of other signalling molecules. Thus, the peptide tag(s) disclosed herein and polypeptide (peptide tag binding partner) of the invention allows the generation of tailored fusion proteins (i.e. protein teams), which could give optimal activation of cellular signalling. These fusion proteins (protein teams) might be applied for controlling cell survival, division, or differentiation.

In yet further embodiments, the peptide tag(s) disclosed herein and polypeptide (peptide tag binding partner) of the invention may find utility in the generation of hydrogels for growth of eukaryotic cells, e.g. neurons, stem cells, preparation of biomaterials, antibody functionalisation with dyes or enzymes and stabilising enzymes by cyclisation.

The invention will now be described in more detail in the following non-limiting Examples with reference to the following drawings.

Figure 3:
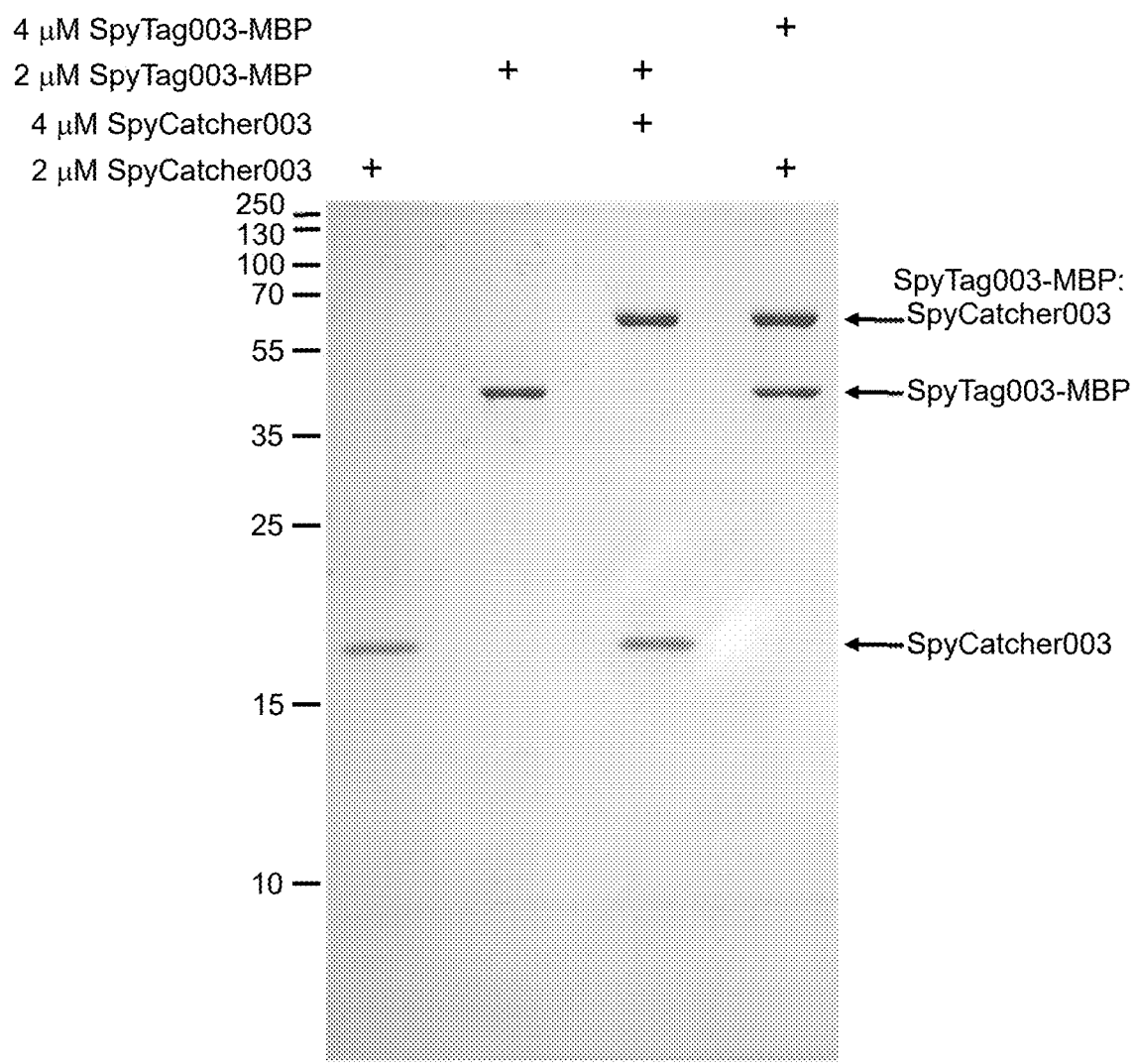

FIG. 3 shows a photograph of a Coomassie-stained SDS-PAGE gel showing the products of various mixtures of polypeptides. The SDS-PAGE gel shows that SpyTag003 and SpyCatcher003 reacted to high yield and 99% completion. SpyCatcher003 was incubated with SpyTag003-MBP, with either component in two-fold excess, for 1½ hours.

Figure 4:
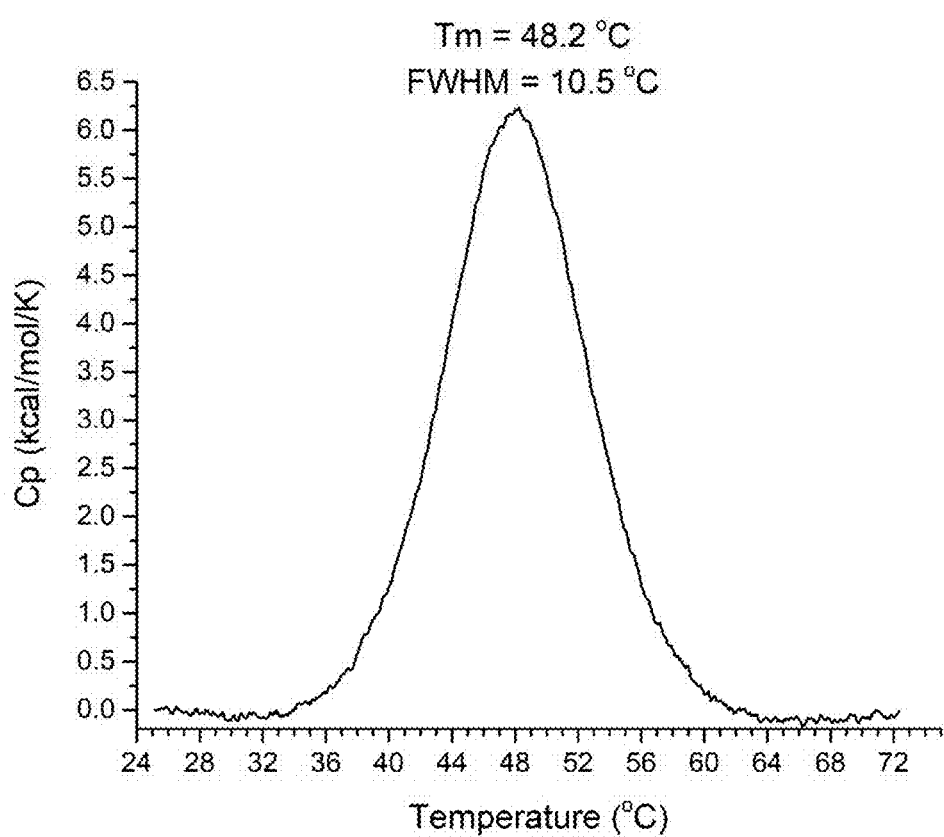

FIG. 4 shows a graph depicting the Differential Scanning Calorimetry of SpyCatcher003. The melting temperature (Tm) and Full Width Half Maximum (FWHM) are indicated.

Figure 5:
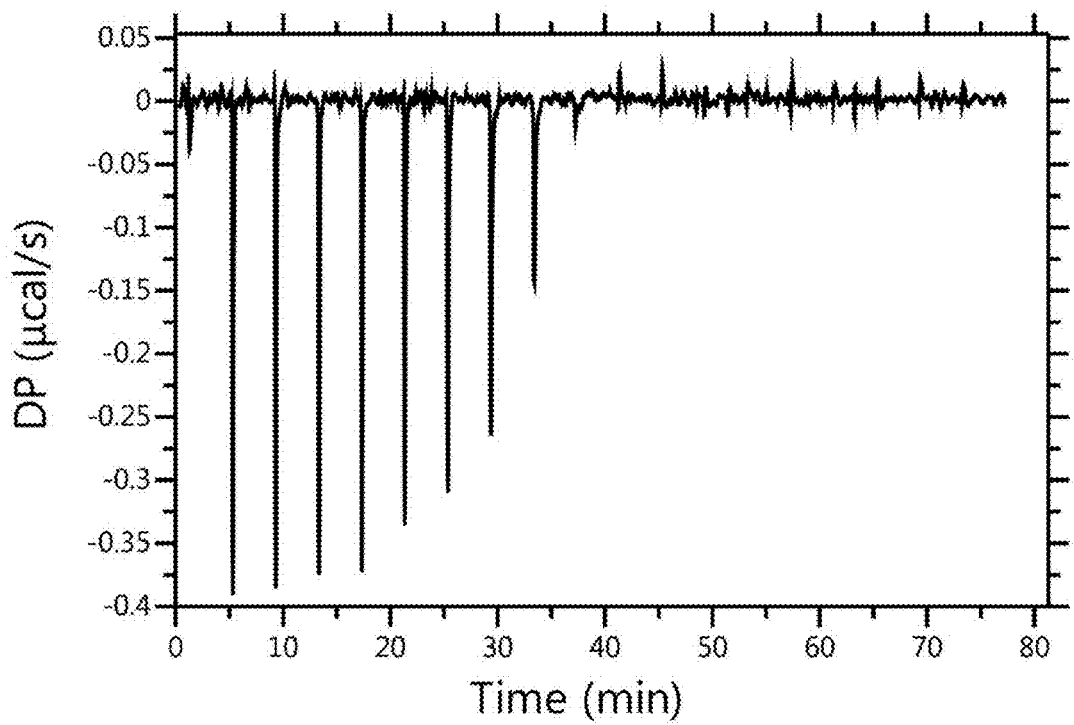
Figure 5:
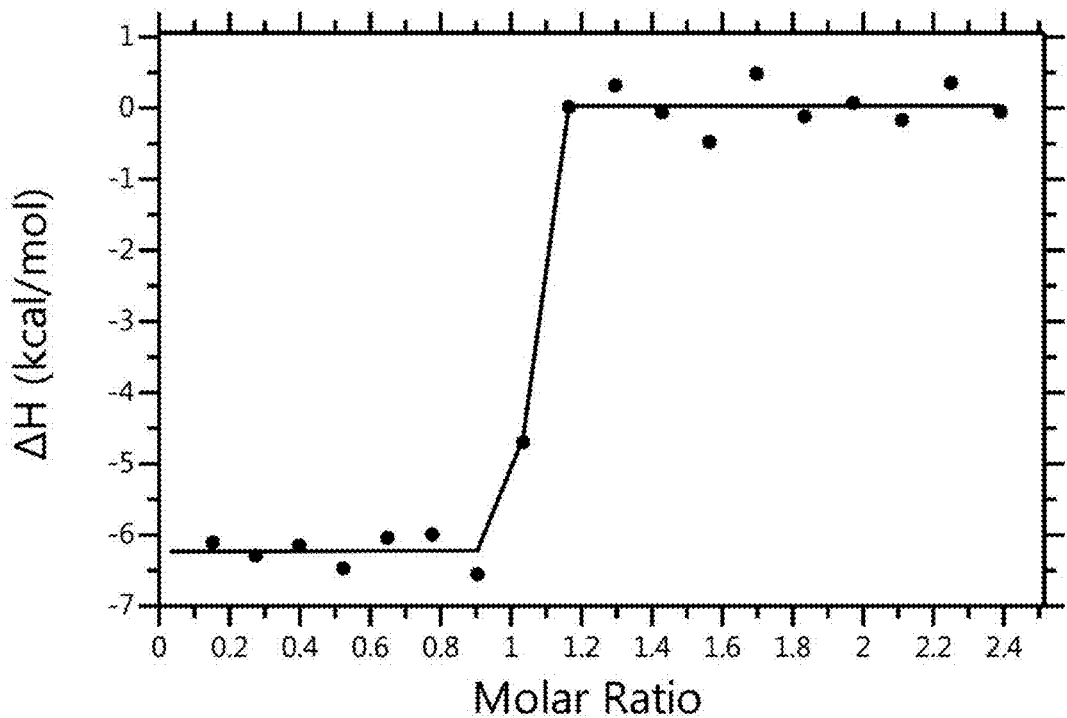

FIG. 5 shows plots showing ITC of SpyCatcher003 interaction with SpyTag003 DA (SEQ ID NO: 11).

Figure 6:
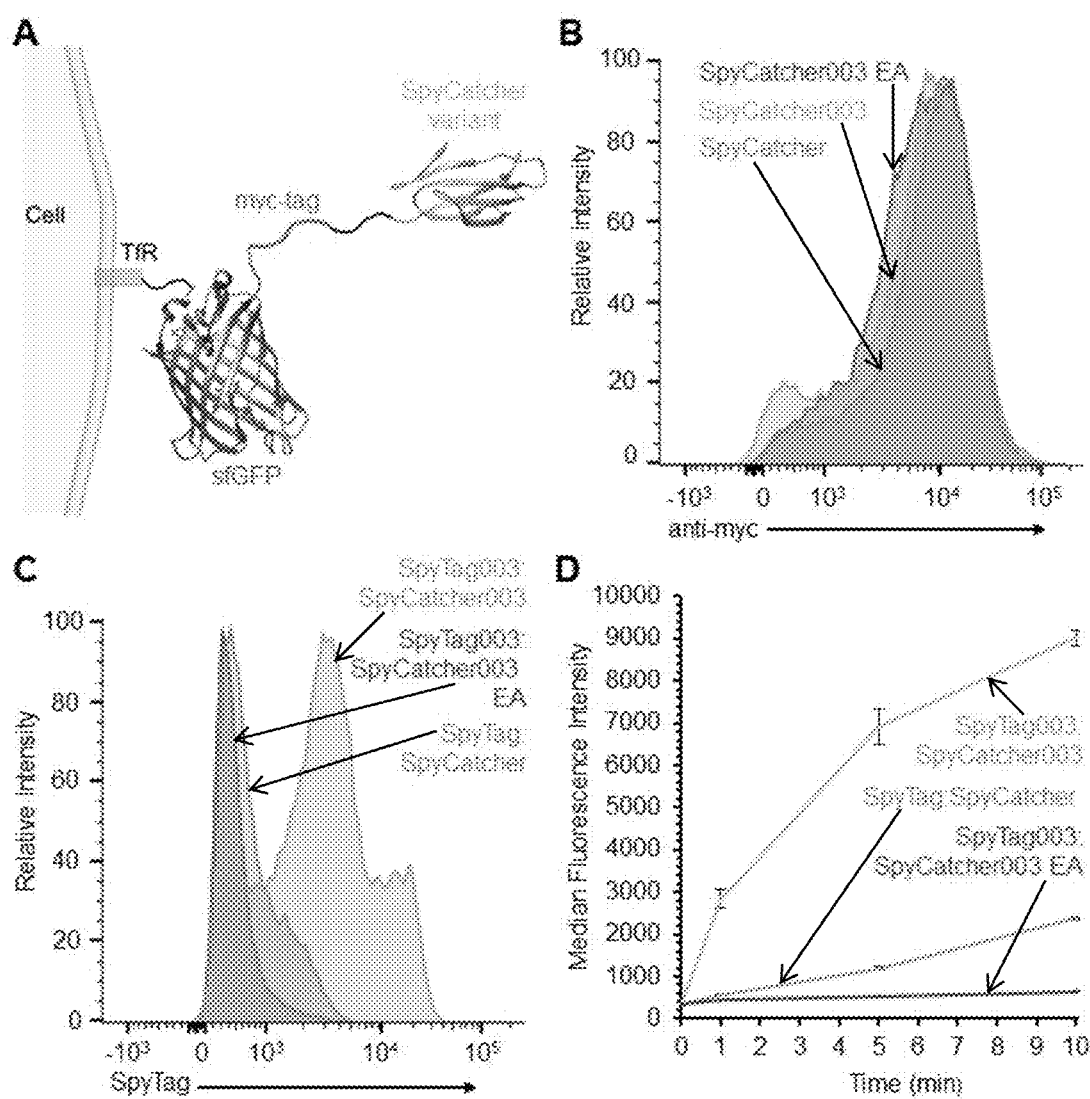

FIG. 6 shows (A) a cartoon model of the cell-surface construct; (B) a plot obtained from flow cytometry of HEK cells bearing SpyCatcher, SpyCatcher003 or SpyCatcher003 EA and stained for surface expression with an antibody to the myc tag by flow cytometry; (C) a plot obtained from flow cytometry of HEK cells bearing SpyCatcher, SpyCatcher003 or SpyCatcher003 EA that were incubated and stained with SpyTag003-mKate2 before flow cytometry; and (D) a graph showing quantification of surface reactivity. Time-course of SpyTag003-staining for cells analysed by flow cytometry as in (C) (mean±1 s.d., n=3).

Figure 7:
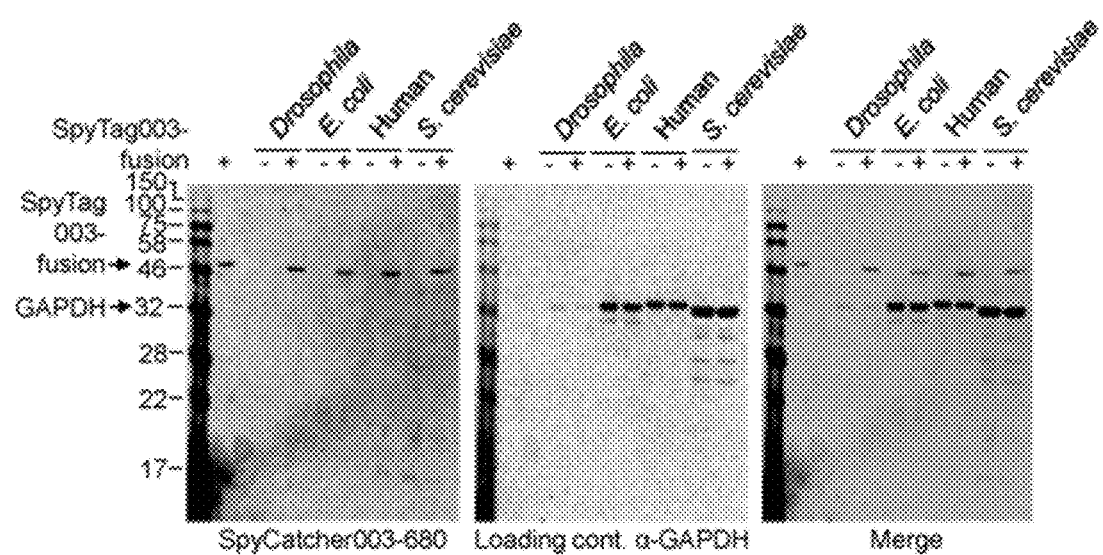

FIG. 7 shows photographs of nitrocellulose membranes produced by Western blotting. Cell lysate from *Drosophila melanogaster*, *Escherichia coli*, human Expi293 cells, or *Saccharomyces cerevisiae* was blotted simultaneously with SpyCatcher003-680 (Left) and anti-GAPDH as a loading control (detected with a secondary antibody at a distinct fluorescence wavelength; Centre). The merge of these 2 signals is shown in Right. In+lanes, 3 pmol SpyTag003-MBPa was doped into the lysate as a positive control.

EXAMPLES

Example 1—Creation of Diffusion-Controlled Protein Coupling: SpyTag003/SpyCatcher003

Rational design was used to improve the charge complementarity and hydrogen bonding capability of the SpyTag/SpyCatcher interaction with the goal of a further step-change in reactivity to move towards the diffusion limit.

It was previously shown in WO 2018/197854 that substitution of the glutamine residue at position 97 of SpyCatcher002 (SEQ ID NO: 7) with aspartic acid resulted in a polypeptide with an increased reaction rate with SpyTag peptides. It was hypothesised that the aspartic acid at this position may form an electrostatic interaction with Lysine 108 thereby increasing the stability of interaction between two loops of the SpyCatcher variant.

However, it was unexpectedly found that a non-conservative substitution of the lysine at position 108 with glutamic acid further improved the reaction rate of the SpyCatcher variant. It is hypothesised that this substitution may improve long-range interactions with the C-terminal arginine and lysines of SpyTag003 (SEQ ID NO: 3).

A further non-conservative substitution of the threonine at position 91 of SpyCatcher002 with glutamic acid and another substitution of asparagine at position 103 of SpyCatcher002 with aspartic acid also functioned to increase the reaction rate of the SpyCatcher variant. It is hypothesised that these mutations complement the increase in positively charged residues on the SpyTag002 (SEQ ID NO: 4) and SpyTag003 (SEQ ID NO: 3) peptides and may make the SpyCatcher conformation pre-oriented for SpyTag docking, thereby increasing reaction rate.

Substitution of the alanine residue at position 89 of SpyCatcher002 (SEQ ID NO:7) with proline has also been shown previously to improve the reaction rate of the polypeptide with SpyTag peptides (see WO 2018/197854).

As shown below, these five substitutions relative to SpyCatcher002 (SEQ ID NO: 7), namely A89P, T91E, Q97D, N103D and K108E, combine to improve the reaction rate of the SpyCatcher variant (herein known as SpyCatcher003, SEQ ID NO: 1) by a further order of magnitude.

Example 2—Validation of SpyTag003 and SpyCatcher003 Reaction Rates

Figure 1:
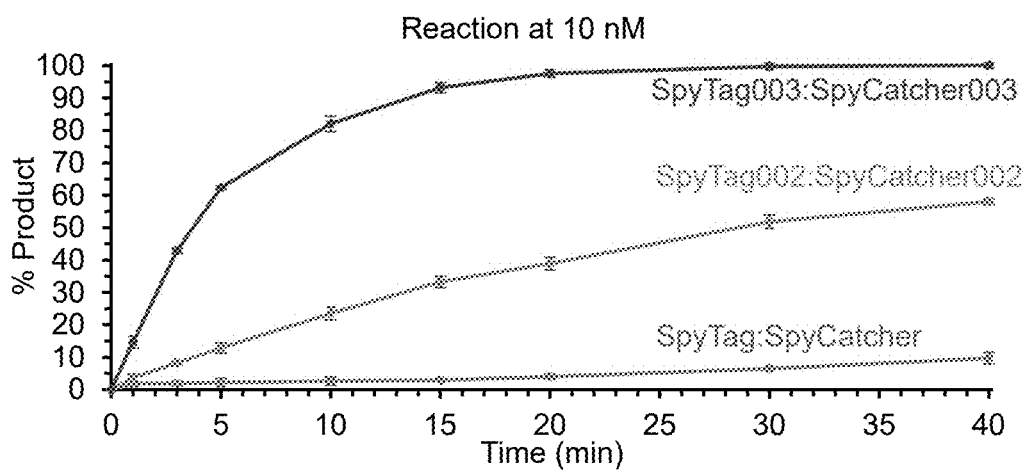
FIG. 1 shows graphs depicting the reaction rate of SpyTag/SpyCatcher pairs at (A) 10 nM, (B) 100 nM and (C) 10 µM. SpyTag-sfGFP variants of the specified concentration were incubated for the indicated time at 25° C. with the same amount of SpyCatcher variants (mean±1 s.d., n=3).
Figure 1:
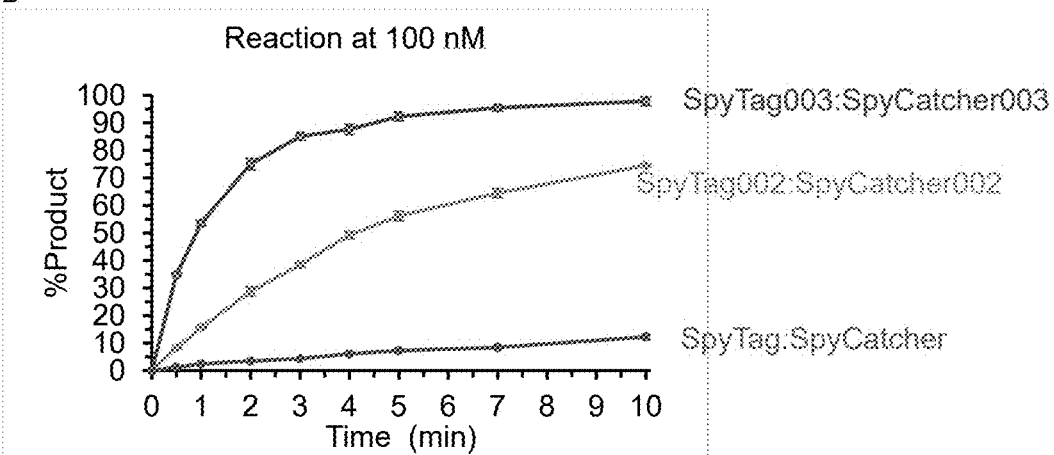
Figure 1:
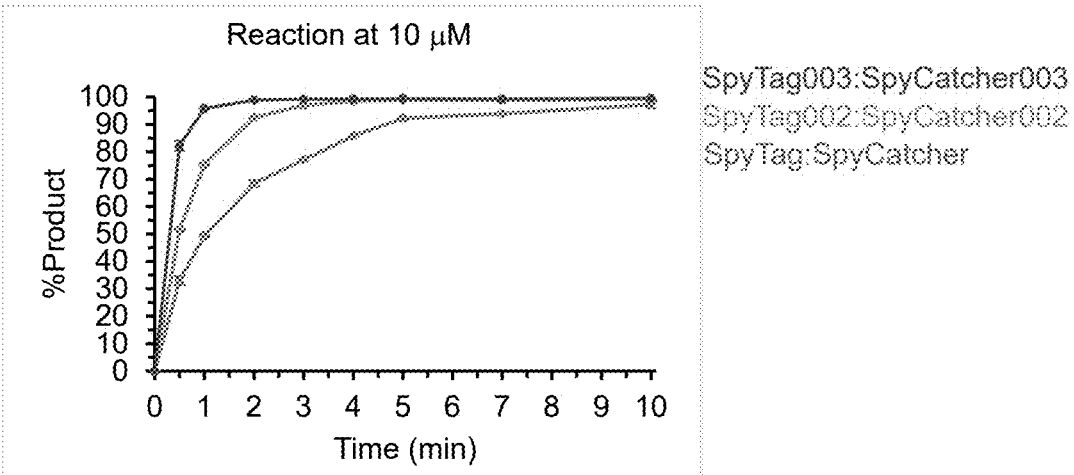
Figure 2:
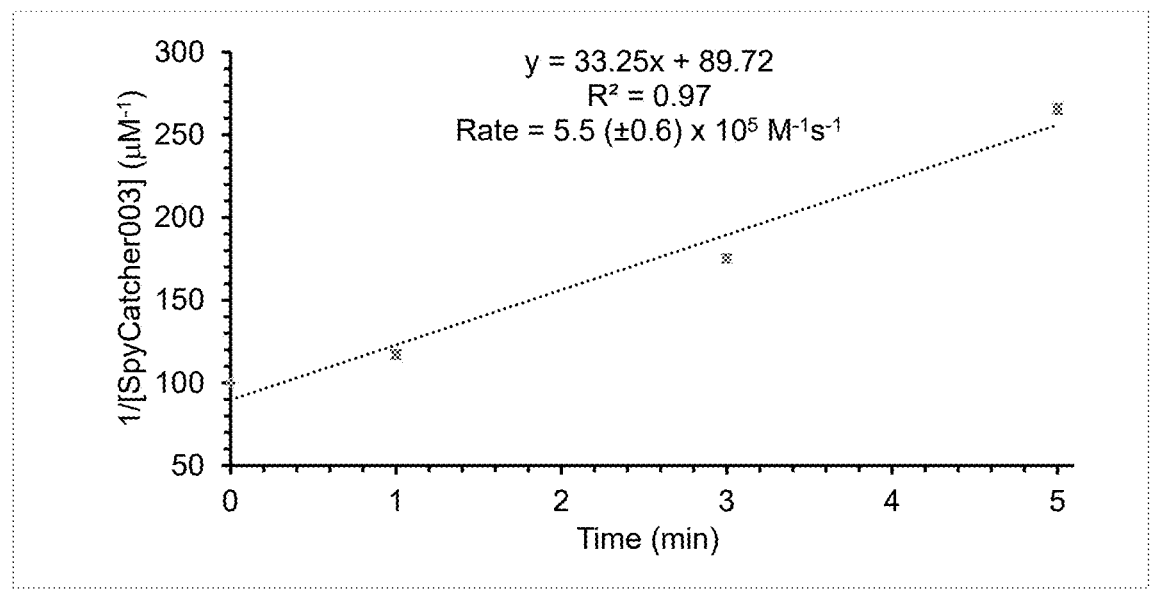
FIG. 2 shows a graph quantifying the rate constant for SpyCatcher003 reacting with SpyTag003. 10 nM SpyTag003-MBP was reacted with 10 nM SpyCatcher003-sfGFP (mean±1 s.d., n=3). The equation for the best fit-line, the correlation coefficient, and the derived second-order rate constant are shown.

The rate of isopeptide bond formation was analysed by fusing SpyCatcher003 (SEQ ID NO: 1) to the N-terminus of super-folder GFP (sfGFP) and reaction with SpyTag003-MBP. Fusion to sfGFP enabled the reaction to be monitored by fluorescence at protein concentrations (10 nM) too low for Coomassie staining. Reaction of SpyTag003/SpyCatcher003 at 10 nM (FIG. 1A), 100 nM (FIG. 1B) and 10 µM (FIG. 1C) occurred substantially faster than for the previous generations—SpyTag/SpyCatcher (SEQ ID Nos: 5/8) and SpyTag002/SpyCatcher002 (SEQ ID Nos: 4/7). This improved reactivity is most striking at the lowest concentration tested (10 nM) where the SpyTag003/SpyCatcher003 (SEQ ID Nos: 3/1) reaction has gone to completion in ~20 minutes, during which time minimal SpyTag/SpyCatcher reaction occurred. The second-order rate constant for SpyTag003/SpyCatcher003 (FIG. 2) was $5.5\pm0.6\times10^5$ $M^{-1}s^{-1}$, orders of magnitude faster than the $1.4\times10^3$ $M^{-1}s^{-1}$ previously shown for SpyTag/SpyCatcher (Zakeri et al., 2012 Proc Natl Acad Sci USA 109, E690-E697), and an order of magnitude faster than the $2.0\times10^4$ $M^{-1}s^{-1}$ for SpyTag002/SpyCatcher002 (Keeble et al., 2017, supra). Considering the size of the reacting species, the rate of isopeptide formation for the 003 pair is now within the $10^5$-$10^6$ $M^{-1}s^{-1}$ range described as the onset for diffusion-controlled protein-protein interactions.

The 003 pair remains back-compatible with previous SpyTag/SpyCatcher generations (Tables 1 and 2 below) and this analysis also indicated that changes in both the Tag and Catcher contributed to the improved reaction speed.

TABLE 1

SpyCatcher003 is compatible with SpyTag peptides

| Rate constant ($M^{-1}s^{-1}$) | SpyTag-MBP | SpyTag002-MBP | SpyTag003-MBP |
|---|---|---|---|
| SpyCatcher003-sfGFP | 2.4 ($\pm0.2$) × $10^4$ | 8.3 ($\pm0.2$) × $10^4$ | 5.5 ($\pm0.6$) × $10^5$ |

Rate constants for reaction of SpyCatcher003-sfGFP with SpyTag003 and earlier versions linked to MBP (mean ± 1 s.d., n = 3).

TABLE 2

SpyTag003 is compatible with SpyCatcher polypeptides

| Rate constant ($M^{-1}s^{-1}$) | SpyCatcher-sfGFP | SpyCatcher002-sfGFP | SpyCatcher003-sfGFP |
|---|---|---|---|
| SpyTag003-MBP | 3.9 ($\pm0.3$) × $10^4$ | 1.3 ($\pm0.1$) × $10^5$ | 5.5 ($\pm0.6$) × $10^5$ |

Rate constants for reaction of SpyTag003-MBP with SpyCatcher003 and earlier versions linked to sfGFP (mean ± 1 s.d., n = 3).

The lack of side-reactions with these proteins was validated by SDS-PAGE to show that both 003 proteins reacted to >95% completion when incubated with excess of their partner (FIG. 3).

Example 3—Biophysical Characterisation of the SpyTag003/SpyCatcher003 Pair

Electrospray ionisation mass spectrometry validated isopeptide bond formation between SpyTag003 and SpyCatcher003, with the loss of 18 Da compared to the sum of molecular weights of the component parts. Differential scanning calorimetry (FIG. 4) showed SpyCatcher003 had a thermal stability ($T_m$) of 48.2° C., close to that previously reported for SpyCatcher (48.5° C.) and SpyCatcher002 (49.9° C.). Therefore, the presence of the five mutations used to change SpyCatcher002 to SpyCatcher003 only had a small effect on stability. Despite the slight decrease in $T_m$, the full width at half maximum (FWHM) for the peak (10.5° C.) is smaller than for either SpyCatcher (16° C.) or SpyCatcher002 (12° C.) (Keeble et al., 2017, supra), indicative of a more co-operative protein unfolding.

Isothermal titration calorimetry (ITC) was used to estimate the affinity of the initial non-covalent complex that occurs when SpyTag003 interacts with SpyCatcher003. This was achieved through mutating the reactive aspartic acid of SpyTag003 to alanine to create SpyTag003 DA-MBP, an approach previously used for SpyTag/SpyCatcher (Zakeri et al., 2012, supra). In contrast to the relatively weak binding ($K_d$=200 μM) previously shown for SpyTag DA-MBP with SpyCatcher (Zakeri et al., 2012, supra), the binding of SpyTag003 DA-MBP to SpyCatcher003 was too tight to measure by ITC (FIG. 5), indicating that the $K_d$ was tighter than 10 nM.

Example 4—Rapid and Specific Reaction at the Surface of Mammalian Cells

The speed and specificity of the SpyTag003/SpyCatcher003 pair on mammalian cells was investigated by display on the plasma membrane of human cells using a transferrin receptor-sfGFP fusion (FIG. 6A). Surface display of the construct was confirmed by flow cytometry, staining against the myc tag (FIG. 6B). This analysis reavealed similar levels of membrane expression of SpyCatcher and SpyCatcher003, as well as the non-reactive control SpyCatcher003 EA (comprising the substitution E77A). Reaction with SpyTag fusion proteins was tested using low concentrations (20 nM) of SpyTag-mKate2 for surface-displayed SpyCatcher or SpyTag003-mKate2 for surface-displayed SpyCatcher003. For SpyTag/SpyCatcher, a large fraction of cells overlapped with the non-reactive control, while for SpyTag003/SpyCatcher003 the majority of cells was clearly resolved from background staining with SpyCatcher003 EA (FIG. 6C). We followed the kinetics of this staining, showing substantially faster staining with the 003 pair compared to the original SpyTag/SpyCatcher (FIG. 6D).

As a control for the specificity of the SpyTag003/Spycatcher003 reaction, we analysed the SpyCatcher003 E77A mutant under the same conditions as above. This mutation deletes the glutamic acid that catalyses isopeptide bond formation, thus preventing reaction with SpyTag constructs (Zakeri et al., 2012, supra). Although SpyCatcher003EA expressed at similar levels to the wild-type (FIG. 6B, the rapid gain in mKate2 fluorescence is not observed (FIGS. 6C and D), confirming that specific reaction of SpyTag003/SpyCatcher003 is occurring.

Example 5—Application of SpyCatcher003 to Western Blotting

To further test the specificity of the SpyTag003:SpyCatcher003 interaction, Western blotting was used against lysates from a range of common model organisms. SpyCatcher003S49C was site-specifically labelled using a maleimide linked to the near-infrared fluorophore DyLight680. The blotting was conducted against cell lysate from *Escherichia coli*, human cells (the Expi293 cell-line), *Saccharomyces cerevisiae*, and *Drosophila melanogaster*. As a positive control, each of these cell lysates was doped with a low amount (3 pmol) of a SpyTag003-fusion. For each species, efficient recognition of the SpyTag003-fusion and minimal cross-reactivity with endogenous cellular proteins was observed (FIG. 7). The anti-glyceraldehyde-3-phosphatedehydrogenase (α-GAPDH) loading control showed some differential binding to the GADPH between species, but equivalent staining with or without the SpyTag003-fusion (FIG. 7).

Methods

Plasmids and Cloning

PCR-based cloning and site-directed mutagenesis were carried out by standard methods using Q5 High-Fidelity Polymerase (NEB) or the KOD polymerase (EMD Millipore) and Gibson assembly. Identity of all constructs was confirmed by Sanger sequencing. pDEST14-SpyCatcher (GenBank JQ478411, Addgene plasmid ID 35044), pET28a-SpyTag-MBP (Addgene plasmid ID 35050), pDEST14 SpyCatcher002 (GenBank MF974388, Addgene plasmid ID 102827), pET28a SpyTag002-MBP (GenBank MF974389 Addgene plasmid ID 102831), pJ404-SpyCatcher-sfGFP, and pJ404-SpyCatcher002-sfGFP were described previously (Zakeri et al., 2012, supra; Keeble et al., 2017, supra). pDEST14 SpyCatcher003 was derived from pDEST14 SpyCatcher002 (Keeble et al., 2017, supra) incorporating the following mutations: A89P, T91E, Q97D, N103D, and K108E. pJ404-SpyCatcher003-sfGFP was derived from incorporating SpyCatcher003 in place of SpyCatcher002 in pJ404-SpyCatcher002 (Keeble et al., 2017, supra). pDEST14-SpyCatcher003 S49C includes a serine to cysteine mutation enabling labeling with maleimide-dyes. pET28a-SpyTagO03-MBP was derived from pET28a-SpyTag002 by making a T3H mutation and by inserting an Arg-Gly pair at the N-terminus of SpyTag002. pET28a-SpyTag003 DA-MBP was derived from pET28a-SpyTagO03-MBP by mutation of the reactive aspartic acid to an alanine (RGVPHIVMVAAYKRYK, SEQ ID NO: 11).

Mammalian membrane expression of SpyCatcher proteins was carried out using pENTR4-TfR-sfGFP-myc tag-SpyCatcher (where TfR is the Transferrin receptor transmembrane domain incorporating C20 and A23 mutations), pENTR4-TfR-sfGFP-myc tag-SpyCatcher003, pENTR4-TfR-sfGFP-myc tag-SpyCatcher003 E77A (where the mutation prevents isopeptide bond formation with SpyTags), and pENTR4-TfR-sfGFP-myc tag-SpyCatcher003-CnaB2 (where the C-terminus of SpyCatcher003 is extended with SpyTag sequence to allow intramolecular isopeptide bond formation as seen in the ancestral CnaB2 domain). pET28-SpyTag003-mKate2 has the organisation of SpyTag003-linker-mKate2-linker-His$_6$. pET28-SpyTag-mKate2 has the same arrangement with SpyTag in place of SpyTag003. pET28-SpyTagO03-sfGFP and pET28-SpyTag003-mClover3 have the organisation SpyTag003-linker-fluorescent protein-linker-His$_6$. pET28-SpyTag003 DA-mClover3 was derived from pET28a-SpyTag003-mClover3 by mutation of the reactive aspartic acid to an alanine. pET28-polyTag-MBP has the organisation His$_{10}$-linker-HA tag-linker-myc tag-linker-Spot tag-linker-SpyTag003-linker-MBP.

Bacterial Protein Expression and Purification by Ni-NTA pDEST14-SpyCatcher003 and pDEST14-SpyCatcher003 S49C were transformed into chemically competent *Escherichia coli* C41 DE3 (a gift from Anthony Watts, University of Oxford), while all other constructs were transformed into *E. coli* BL21 (DE3) RIPL (Agilent). Single colonies were picked into 10 mL LB containing either 100 µg/mL ampicillin (pDEST14 and pJ404) or 50 µg/mL kanamycin (pET28a) and grown overnight at 37° C. with shaking at 200 rpm. 1 L LB supplemented with 0.8% (w/v) glucose and appropriate antibiotic in ultra-yield baffled flasks (Thomson Instrument Company) was inoculated with 1/100 dilution of the saturated overnight culture and grown at 37° C. with shaking at 200 rpm. After reaching OD600 0.5-0.6, the cultures were inoculated with 0.42 mM IPTG and incubated at 30° C. with shaking at 200 rpm for 4-5 h. For pET28a-SpyTag003-mKate2, a single colony was picked in to 1 L of autoinduction media plus trace elements (Formedia) supplemented with 50 µg/mL kanamycin and grown at 30° C. for 24 h with shaking at 200 rpm. Cells were harvested and lysed by sonication in 1× Ni-NTA buffer (50 mM Tris-HCl, 300 mM NaCl, pH 7.8) containing mixed protease inhibitors (cOmplete mini EDTA-free protease inhibitor cocktail, Roche) and 1 mM phenylmethylsulfonyl fluoride (PMSF). Cell lysates were centrifuged at 30,000 g for 25 min before purification using Ni-NTA resin (Qiagen) using standard procedures. After elution, proteins were dialysed into PBS (137 mM NaCl, 2.7 mM KCl, 10 mM Na$_2$HPO$_4$, 1.8 mM KH$_2$PO$_4$, pH 7.5) with three buffer changes using 3.5 kDa molecular weight cut-off Spectra/Por dialysis tubing (Spectrum Labs). Protein concentrations were determined from OD280 using the extinction coefficients from ExPASy ProtParam.

Isopeptide Bond Formation Assays

Reactions were carried out at pH 7.0 and 25° C. in succinate-phosphate-glycine buffer (12.5 mM succinic acid, 43.75 mM NaH$_2$PO$_4$, 43.75 mM glycine; pH adjusted to 7.0 using NaOH) (Keeble et al., 2017, supra). Reactions were analysed using SDS-PAGE on 16% polyacrylamide gels using the XCell SureLock system (Thermo Fisher Scientific) at 180 V. Bands were quantified using a Fluorescent Image Analyzer FLA-3000 (FujiFilm) and ImageGauge version 5.21 software.

For measuring the concentration dependent rates (FIGS. 1A and 2) SpyCatcher-sfGFP, SpyCatcher002-sfGFP and SpyCatcher003-sfGFP were reacted with SpyTag-MBP, SpyTag002-MBP, and SpyTag003-MBP. The sfGFP fusions were used to enable reactions to be carried out at concentrations as low as 10 nM. The reaction was quenched at 50° C. for 5 min after addition of 6×SDS-loading buffer [0.23 M Tris HCl pH 6.8, 24% (v/v) glycerol, 120 µM bromophenol blue, 0.23 M SDS] in a Bio-Rad C1000 thermal cycler to retain the fluorescence of sfGFP. Percentage isopeptide product formation was calculated by dividing the intensity of the band for the covalent complex by the intensity of all the bands in the lane and multiplying by 100. In order to correct for differential photobleaching of the sfGFP at different time-points, the second-order rate constant for covalent complex formation was determined by monitoring the reduction in the relative intensity of the band for the SpyCatcher-variant-sfGFP to give the change in the concentration of the unreacted SpyCatcher-variant-sfGFP. Timepoints were analysed during the linear portion of the reaction curve. 1/[SpyCatcher variant] was plotted against time and analysed by linear regression using Excel (Microsoft) and Origin 2015 (OriginLab Corporation). Experiments were carried out in triplicate and the data represent the mean±1 standard deviation.

For measuring SpyCatcher003 and SpyTag003-MBP reaction to completion (FIG. 5) experiments were carried out in succinate-phosphate-glycine buffer at pH 7.0 for 1.5 h at 25° C., with one partner at 2 µM and the other partner at 2 or 4 µM.

Isothermal Titration Calorimetry

Experiments were carried out using a Microcal PEAQ-ITC calorimeter (Malvern) at 20° C. in PBS pH 7.4. 20 µM SpyCatcher003 was used in the cell and titrated with 20 injections of 210 µM SpyTag003-DA-MBP in the syringe. Analysis was carried out using a 1:1 binding model using MicroCal PEAQ-ITC Analysis software version 1.1.0.1262.

Differential Scanning Calorimetry

Experiments were performed with 30 µM SpyCatcher, SpyCatcher002 or SpyCatcher003 in PBS pH 7.5 on a MicroCal PEAQ-DSC (Malvern). Thermal transitions were monitored from 20 to 100° C. at a scan rate of 3° C./min at 3 atm. Data were analysed using MicroCal PEAQ-DSC analysis software version 1.22. The buffer (PBS pH 7.5) blank was subtracted from the experimental sample and corrected for concentration and volume, followed by the baseline subtraction. Subsequently the observed transition was fitted to a two-state model to obtain the melting temperature ($T_m$) and Full Width Half Maximum using the MicroCal PEAQ-DSC analysis software version 1.22 and Origin 2015 (OriginLab Corporation).

Mass Spectrometry

30 µM SpyCatcher003 was reacted with 60 µM SpyTag003 peptide (SEQ ID NO: 3, solid-phase synthesised by Insight Biotechnology at >95% purity) for 1 h at 25° C. in SPG buffer pH 7.0. The reaction was dialysed against 10 mM ammonium acetate pH 7.5 using 3.5 kDa cut-off Spectra/Por dialysis tubing (Spectrum labs) prior to analysis.

An Agilent RapidFire 365 platform was coupled to the Agilent 6550 Accurate-Mass Quadrupole Time-of-Flight (Q-TOF) mass spectrometer. This system was used to perform intact protein mass spectrometry in positive ion-mode employing a jet-stream electrospray ion source (Agilent). Samples at 10 µM in 50 µL volume were prepared on a 384-well polypropylene plate (Greiner) and acidified to 1% (v/v) formic acid. The samples were aspirated under vacuum for 0.4 s using the RapidFire sampling platform. Samples were loaded onto a C4 solid-phase extraction cartridge. After washes with 0.1% (v/v) formic acid with 1.5 mL/min flow-rate for 5.5 s, the samples were eluted with deionised water containing 85% (v/v) acetonitrile and 0.1% (v/v) formic acid at 1.25 mL/min for 5.5 s. The cartridge was then equilibrated with deionised water for 0.5 s. Nitrogen drying gas for the ionisation source was operated at 13 L/min at 225° C. The jet stream sheath gas was at a flow-rate of 12 L/min at 350° C. and the nozzle voltage was 1,500 V. The data were analysed using Mass Hunter Qualitative Analysis software version 7.0. The protein ionisation data were deconvoluted using the maximum entropy algorithm. The Predicted mass came from ExPASy ProtParam, based on cleavage of the N-terminal formylmethionine.

Mammalian Cell Expression of SpyCatcher

TfR-sfGFP-myc tag-SpyCatcher variants were expressed in suspension Expi293HEK cells (Thermo Fisher Scientific) cultured in Expi293 Expression media (Thermo Fisher Scientific) supplemented with 50 U/mL penicillin/streptomycin (Thermo Fisher Scientific). Cells were grown in a humidified Multitron Cell incubator (Infors HT) at 37° C. with 7% $CO_2$, rotating at 110-125 rpm. Cells at a density of $3.0 \times 10^6$ cells/mL were transfected with 2.7 µL ExpiFectamine 293 Reagent per 1 µg of plasmid DNA. ExpiFectamine transfection enhancers (Thermo Fisher Scientific) were added 16-22 h post-transfection. Cells were grown for 48 h and then analysed.

Flow Cytometry

Cells were washed twice in FACS buffer [PBS pH 7.5, 1 mM EDTA, 1% bovine serum albumin, 0.1% (w/v) sodium azide] by centrifugation at 300 g at 4° C. for 3 min. For labelling cells with anti-myc-AlexaFluor 647 antibody Invitrogen) $0.5\text{-}1\times10^6$ cells were reacted with the antibody at a concentration of 5 µg/mL for 20 min on ice in the FACS buffer, followed by washing the cells twice in FACS buffer. 20 nM SpyTag variant-mKate2 constructs were reacted with $0.5\text{-}1\times10^6$ cells in 2 mL FACS buffer on ice, with the reaction time quenched by 10 µM SpyCatcher003, followed by washing the cells twice in FACS buffer. Cells were analysed on a BD Fortessa X20, gating on live cells using DAPI staining. Data were analysed using FlowJo version 9.0. Experiments were carried out in triplicate and the data represent the mean±1 standard deviation.

Fluorophore Conjugation

The following steps took place in the dark. DyLightmalemide and DyLight-NHS Ester (hereafter collectively referred to as DyLight) was dissolved in anhydrous DMSO to a final concentration of 10 µg/µL, samples were aliquoted and stored at −80° C. until use. SpyCatcher 003-S49C in either a Tris (DyLight-malemide; pH 8.5), or PBS (DyLight-NHS Ester; pH 7.5) buffer was incubated with the relevant DyLight with a 10 fold molar excess of Dye:Protein to ensure maximum labelling of the protein. Samples were rapidly pipetted to thoroughly mix the samples prior to being tumbled at RT for 4 hours. Following incubation, samples were centrifuged at 16,000 g for 5 min to remove aggregates. Swollen Sephadex G-25 resin (800 µL) was added to a Bio-Rad Poly-Prep column and washed with 4 mL PBS to remove residual storage ethanol. The PBS was allowed to drain, and the samples were added to the column to remove unconjugated dye. A further 1 mL PBS was added to the top of the column and 300 µL fractions were collected. Fractions 1 and 2 were pooled and dialysed 3×3 hours in PBS at 4° C.

Conjugation efficiency was determined by Nanodrop spectrophotometer and utilising the equations:

$$\text{Protein concentration}(M) = \frac{[A_{280} - (A_{max} \times CF)]}{\varepsilon_{protein}} \times \text{dilution factor}$$

$\varepsilon_{protein}$=protein molar extinction coefficient
CF=Correction factor (found on Thermo Fisher Dye info page below, for DyLight 680=0.128)

$$\text{Moles dye per mole protein} = \frac{A_{max} \text{ of the labeled protein} \times \text{dilution factor}}{\varepsilon_{fluor} \times \text{protein concentration}(M)}$$

Western Blotting

Untransformed *E. coli* Turbo cells (NEB) were grown for 8 h, pelleted and resuspended in PBS pH 7.4 in the presence of cOmplete mini EDTA-free protease inhibitor cocktail (Roche) and 1 mM PMSF. $1.5 \times 10^7$ human Expi293 cells were pelleted and lysed in 5 mL lysis buffer [150 mM NaCl, 50 mM Tris-HCl pH 7.5, 1% (v/v) Triton X-100, 1 mM EDTA, in the presence of cOmplete mini EDTA-free protease inhibitor cocktail (Roche) and 1 mM PMSF]. *S. cerevisiae* strain K699 was a kind gift of the Nasmyth laboratory, University of Oxford. The *Drosophila melanogaster* sample was GenLysate (G-Biosciences). Lysate was aliquoted and stored at −80° C. until use. For testing by Western blot, 3 pmol SpyTag003-MBPa was doped into selected samples of the cell lysate. Samples were mixed with 6× SDS loading buffer, and heated for 3 min at 99° C. in a Bio-Rad C1000 thermal cycler. 5 µg cell lysate was loaded per lane, except for *D. melanogaster* where 10 µg was loaded to counteract the weak anti-GAPDH recognition.

Protein samples and cell lysate were resolved by 16% SDS-PAGE using the XCell SureLock system (Thermo Fisher) at 200 V. Samples were transferred onto equibrated nitrocellulose membrane (Bio-Rad; 162-0112) between filter paper (Fisherbrand; FB59025) in transfer buffer [10% (v/v) MeOH, 25 mM Tris base, 192 mM glycine) using the XCell II Western blot module (Thermo Fisher) at 35 V for 90 min. Membranes were blocked in 5% (w/v) skimmed milk made in PBS pH 7.4 with 0.05% (v/v) Tween-20 (PBST) for a minimum of 1 h. Membranes were then probed with 13 nM SpyCatcher003-680 and 1:500 anti-GAPDH-DyLight 800 (Thermo Fisher) in PBST with 5% (w/v) skimmed milk for 2 h at 25° C. The membrane was washed while protected from light for a minimum of 3×30 min in PBST, 1×30 min in PBS pH 7.4, and rinsed in MilliQ $H_2O$. Western blots were imaged using a Li-Cor Odyssey Fc and image analysis was conducted using Image Studio Lite 5.2 (Li-Cor).

The invention claimed is:

1. A polypeptide comprising:
   i) an amino acid sequence as set forth in SEQ ID NO: 1, which comprises a lysine residue at position 31; or
   ii) an amino acid sequence as set forth in SEQ ID NO: 2, which comprises a lysine residue at position 10; or
   iii) an amino acid sequence with at least 80% sequence identity to a sequence as set forth in SEQ ID NO: 1, wherein said amino acid sequence comprises a lysine at position 31, a glutamic acid at position 77 and one or more of the following specified amino acid residues:
      1) A glutamic acid at position 91;
      2) An aspartic acid at position 103; and/or
      3) A glutamic acid at position 108;
   wherein the specified amino acid residues are at positions equivalent to the positions in SEQ ID NO: 1; or
   iv) an amino acid sequence with at least 80% sequence identity to a sequence as set forth in SEQ ID NO: 2, wherein the amino acid sequence comprises a lysine at position 10, a glutamic acid at position 56 and one or more of the following specified amino acid residues:
      1) A glutamic acid at position 70;
      2) An aspartic acid at position 82; and/or
      3) A glutamic acid at position 87;
   wherein the specified amino acid residues are at positions equivalent to the positions in SEQ ID NO: 2,
   and wherein said polypeptide is capable of spontaneously forming an isopeptide bond with a peptide comprising an amino acid sequence as set forth in SEQ ID NO: 3, which comprises an aspartic acid residue at position 10, wherein said isopeptide bond forms between the aspartic acid residue at position 10 of SEQ ID NO: 3 and the lysine residue at position 31 of SEQ ID NO: 1 or position 10 of SEQ ID NO: 2 or at a position equivalent to position 31 in SEQ ID NO: 1 or position 10 of SEQ ID NO: 2.

2. The polypeptide of claim 1, wherein the polypeptide comprises an amino acid sequence with at least 80% sequence identity to a sequence as set forth in SEQ ID NO: 1, wherein said amino acid sequence comprises a lysine at position 31, a glutamic acid at position 77 and all of the following specified amino acid residues:
   1) A glutamic acid at position 91;
   2) An aspartic acid at position 103; and
   3) A glutamic acid at position 108;
wherein the specified amino acid residues are at positions equivalent to the positions in SEQ ID NO: 1.

3. The polypeptide of claim 1, wherein the polypeptide comprises an amino acid sequence with at least 80% sequence identity to a sequence as set forth in SEQ ID NO: 1, wherein said amino acid sequence comprises a lysine at position 31, a glutamic acid at position 77 and all of the following specified amino acid residues:
   1) A proline at position 89;
   2) A glutamic acid at position 91;
   3) An aspartic acid at position 97;
   4) An aspartic acid at position 103; and
   5) A glutamic acid at position 108;
wherein the specified amino acid residues are at positions equivalent to the positions in SEQ ID NO: 1.

4. The polypeptide of claim 1, wherein the polypeptide comprises an amino acid sequence with at least 80% sequence identity to a sequence as set forth in SEQ ID NO: 1, wherein said amino acid sequence comprises a lysine at position 31, a glutamic acid at position 77 and one or more of the following specified amino acid residues:
   1) A threonine at position 2;
   2) A proline at position 13;
   3) An arginine at position 37;
   4) A histidine at position 62;
   5) A glutamic acid at position 105; and/or
   6) A threonine at position 113,
wherein the specified amino acid residues are at positions equivalent to the positions in SEQ ID NO: 1.

5. The polypeptide of claim 1, wherein the polypeptide comprises an amino acid sequence with at least 80% sequence identity to a sequence as set forth in SEQ ID NO: 1, wherein said amino acid sequence comprises a lysine at position 31, a glutamic acid at position 77 and all of the following specified amino acid residues:
   1) A threonine at position 2;
   2) A proline at position 13;
   3) An arginine at position 37;
   4) A histidine at position 62;
   5) A proline at position 89;
   6) An aspartic acid at position 97;
   7) A glutamic acid at position 105; and
   8) A threonine at position 113,
wherein the specified amino acid residues are at positions equivalent to the positions in SEQ ID NO: 1.

6. The polypeptide of claim 1, wherein the polypeptide comprises an amino acid sequence with at least 80% sequence identity to a sequence as set forth in SEQ ID NO: 1, wherein said amino acid sequence comprises a lysine at position 31, a glutamic acid at position 77 and all of the following specified amino acid residues:
   1) A threonine at position 2;
   2) A proline at position 13;
   3) An arginine at position 37;
   4) A histidine at position 62;
   5) A proline at position 89;
   6) An aspartic acid at position 97;
   7) A glutamic acid at position 105; and
   8) A threonine at position 113,
and two or more of the following specified amino acid residues:
   9) a glutamic acid at position 91;
   10) An aspartic acid at position 103; and
   11) A glutamic acid at position 108;
wherein the specified amino acid residues are at positions equivalent to the positions in SEQ ID NO: 1.

7. The polypeptide of claim 1, wherein the polypeptide comprises an amino acid sequence with at least 80% sequence identity to a sequence as set forth in SEQ ID NO: 1, wherein said amino acid sequence comprises a lysine at position 31, a glutamic acid at position 77 and all of the following specified amino acid residues:
   1) A threonine at position 2;
   2) A proline at position 13;
   3) An arginine at position 37;
   4) A histidine at position 62;
   5) A proline at position 89;
   6) An aspartic acid at position 97;
   7) A glutamic acid at position 105;
   8) A threonine at position 113,
   9) a glutamic acid at position 91;
   10) An aspartic acid at position 103; and
   11) A glutamic acid at position 108,
wherein the specified amino acid residues are at positions equivalent to the positions in SEQ ID NO: 1.

8. The polypeptide of claim 1, wherein the polypeptide comprises:
   (A) one or both of the following specified amino acid residues:
      1) A glycine at position 9; and
      2) a threonine at position 19; and/or
   (B) one or more of the following specified amino acid residues:
      1) A glutamic acid at position 34;
      2) A serine at position 50;
      3) A tyrosine at position 69;
      4) A glycine at position 83; and/or
      5) a valine at position 86;
wherein the specified amino acid residues are at positions equivalent to the positions in SEQ ID NO: 1.

9. The polypeptide of claim 1, wherein the polypeptide comprises one or more of the following specified amino acid substitutions:
   1) Substitution of a lysine with a glutamine at position 52;
   2) Substitution of a valine with an aspartic acid at position 63;
   3) Substitution of a tyrosine with a serine at position 69;
   4) Substitution of a threonine with a leucine at position 88; and/or
   5) Substitution of a glutamic acid with a proline at position 96;
wherein the specified amino acid substitutions are at positions equivalent to the positions in SEQ ID NO: 1.

10. The polypeptide of claim 1, wherein the polypeptide is conjugated to a nucleic acid molecule, protein, peptide, small-molecule organic compound, fluorophore, metal-ligand complex, polysaccharide, nanoparticle, 2D monolayer, nanotube, polymer, cell, virus, virus-like particle or a combination thereof.

11. The polypeptide of claim 1, wherein the polypeptide is immobilized on a solid substrate.

12. A recombinant or synthetic polypeptide comprising a peptide or polypeptide linked to the polypeptide as defined in claim 1.

13. A nucleic acid molecule comprising a nucleotide sequence which encodes:
   i) the polypeptide as defined in claim 1; or
   ii) a recombinant or synthetic polypeptide comprising a peptide or polypeptide linked to the polypeptide as defined in claim 1.

14. A vector comprising the nucleic acid molecule of claim 13.

15. A cell comprising a nucleic acid comprising a nucleotide sequence which encodes the polypeptide as defined in claim 1 or a vector comprising said nucleic acid molecule.

16. A process for producing or expressing the polypeptide of claim 1 or a recombinant polypeptide comprising a peptide or polypeptide linked to the polypeptide of claim 1, the process comprising the steps of:
   a) transforming or transfecting a host cell with a vector comprising a nucleic acid molecule comprising a nucleotide sequence which encodes (i) the polypeptide as defined in claim 1 or (ii) a recombinant polypeptide comprising a peptide or polypeptide linked to the polypeptide as defined in claim 1;
   b) culturing the host cell under conditions which allow the expression of the polypeptide; and optionally
   c) isolating the polypeptide.

17. A process for conjugating two molecules or components via an isopeptide bond comprising:
   a) providing a first molecule or component comprising the polypeptide of claim 1;
   b) providing a second molecule or component comprising a peptide selected from:
      (1) a peptide comprising an amino acid sequence as set forth in SEQ ID NO: 5, which comprises an aspartic acid residue at position 7; and
      (2) a peptide comprising an amino acid sequence as set forth in SEQ ID NO: 6, which comprises an aspartic acid residue at position 10, wherein:
      (i) Xaa at position 1 is an arginine or no amino acid;
      (ii) Xaa at position 2 is a glycine or no amino acid;
      (iii) Xaa at position 5 is a histidine or a threonine;
      (iv) Xaa at position 11 is an alanine, a glycine or a valine; and
      (v) Xaa at position 14 is an arginine or a lysine,
   wherein when Xaa at position 1 is no amino acid, Xaa at position 2 is no amino acid,
   and wherein said peptide is capable of spontaneously forming an isopeptide bond with a polypeptide comprising an amino acid sequence as set forth in SEQ ID NO: 1, which comprises a lysine residue at position 31 or a polypeptide comprising an amino acid sequence as set forth in SEQ ID NO: 2 which comprises a lysine residue at position 10, wherein said isopeptide bond forms between the aspartic acid residue at position 7 of SEQ ID NO: 5 or at position 10 of SEQ ID NO: 6 and the lysine residue at position 31 of SEQ ID NO: 1 or position 10 of SEQ ID NO: 2;
   c) contacting said first and second molecules or components under conditions that enable the spontaneous formation of an isopeptide bond between the polypeptide and peptide, thereby conjugating said first molecule or component to said second molecule or component via an isopeptide bond to form a complex.

18. A kit comprising:
   (a) the polypeptide of claim 1, optionally conjugated or fused to a molecule or component; and
   (b) a peptide selected from:
      (1) a peptide comprising an amino acid sequence as set forth in SEQ ID NO: 5, which comprises an aspartic acid residue at position 7; and
      (2) a peptide comprising an amino acid sequence as set forth in SEQ ID NO: 6, which comprises an aspartic acid residue at position 10, wherein:
      (i) Xaa at position 1 is an arginine or no amino acid;
      (ii) Xaa at position 2 is a glycine or no amino acid;
      (iii) Xaa at position 5 is a histidine or a threonine;

(iv) Xaa at position 11 is an alanine, a glycine or a valine; and (v) Xaa at position 14 is an arginine or a lysine, wherein when Xaa at position 1 is no amino acid, Xaa at position 2 is no amino acid, and wherein said peptide is capable of spontaneously forming an isopeptide bond with a polypeptide comprising an amino acid sequence as set forth in SEQ ID NO: 1, which comprises a lysine residue at position 31, or a polypeptide comprising an amino acid sequence as set forth in SEQ ID NO: 2 which comprises a lysine residue at position 10 wherein said isopeptide bond forms between the aspartic acid residue at position 7 of SEQ ID NO: 5 or at position 10 of SEQ ID NO: 6 and the lysine residue at position 31 of SEQ ID NO: 1 or position 10 of SEQ ID NO: 2, optionally conjugated or fused to a molecule or component; and/or (c) a nucleic acid molecule encoding the polypeptide as defined in (a); and (d) a nucleic acid molecule encoding the peptide as defined in (b).

19. The kit of claim 18, wherein the peptide of (2) comprises one or more of the following specified amino acid residues:

1) A histidine at position 5;

2) An alanine at position 11; and/or

3) An arginine at position 14, wherein the specified amino acid residues are at positions equivalent to the positions in SEQ ID NO: 6.

20. The kit of claim 18, wherein the peptide of (2) comprises an amino acid sequence as set forth in SEQ ID NO: 3 or 4.

\* \* \* \* \*

SEQUENCE LISTING

<160> NUMBER OF SEQ ID NOS: 13

<210> SEQ ID NO 1
<211> LENGTH: 113
<212> TYPE: PRT
<213> ORGANISM: Artificial Sequence
<220> FEATURE:
<223> OTHER INFORMATION: SpyCatcher003

<400> SEQUENCE: 1

Val Thr Thr Leu Ser Gly Leu Ser Gly Glu Gln Gly Pro Ser Gly Asp
1               5                   10                  15

Met Thr Thr Glu Glu Asp Ser Ala Thr His Ile Lys Phe Ser Lys Arg
            20                  25                  30

Asp Glu Asp Gly Arg Glu Leu Ala Gly Ala Thr Met Glu Leu Arg Asp
        35                  40                  45

Ser Ser Gly Lys Thr Ile Ser Thr Trp Ile Ser Asp Gly His Val Lys
    50                  55                  60

Asp Phe Tyr Leu Tyr Pro Gly Lys Tyr Thr Phe Val Glu Thr Ala Ala
65                  70                  75                  80

Pro Asp Gly Tyr Glu Val Ala Thr Pro Ile Glu Phe Thr Val Asn Glu
                85                  90                  95

Asp Gly Gln Val Thr Val Asp Gly Glu Ala Thr Glu Gly Asp Ala His
            100                 105                 110

Thr

<210> SEQ ID NO 2
<211> LENGTH: 92
<212> TYPE: PRT
<213> ORGANISM: Artificial Sequence
<220> FEATURE:
<223> OTHER INFORMATION: Truncated SpyCatcher003

<400> SEQUENCE: 2

Asp Ser Ala Thr His Ile Lys Phe Ser Lys Arg Asp Glu Asp Gly Arg
1               5                   10                  15

Glu Leu Ala Gly Ala Thr Met Glu Leu Arg Asp Ser Ser Gly Lys Thr
            20                  25                  30

Ile Ser Thr Trp Ile Ser Asp Gly His Val Lys Asp Phe Tyr Leu Tyr
        35                  40                  45

Pro Gly Lys Tyr Thr Phe Val Glu Thr Ala Ala Pro Asp Gly Tyr Glu
    50                  55                  60

Val Ala Thr Pro Ile Glu Phe Thr Val Asn Glu Asp Gly Gln Val Thr
65                  70                  75                  80

Val Asp Gly Glu Ala Thr Glu Gly Asp Ala His Thr
                85                  90

<210> SEQ ID NO 3
<211> LENGTH: 16
<212> TYPE: PRT
<213> ORGANISM: Artificial Sequence
<220> FEATURE:
<223> OTHER INFORMATION: SpyTag003

<400> SEQUENCE: 3

Arg Gly Val Pro His Ile Val Met Val Asp Ala Tyr Lys Arg Tyr Lys
1               5                   10                  15

<210> SEQ ID NO 4
<211> LENGTH: 14

```
<212> TYPE: PRT
<213> ORGANISM: Artificial Sequence
<220> FEATURE:
<223> OTHER INFORMATION: SpyTag002

<400> SEQUENCE: 4

Val Pro Thr Ile Val Met Val Asp Ala Tyr Lys Arg Tyr Lys
1               5                   10

<210> SEQ ID NO 5
<211> LENGTH: 13
<212> TYPE: PRT
<213> ORGANISM: Artificial Sequence
<220> FEATURE:
<223> OTHER INFORMATION: SpyTag

<400> SEQUENCE: 5

Ala His Ile Val Met Val Asp Ala Tyr Lys Pro Thr Lys
1               5                   10

<210> SEQ ID NO 6
<211> LENGTH: 16
<212> TYPE: PRT
<213> ORGANISM: Artificial Sequence
<220> FEATURE:
<223> OTHER INFORMATION: SpyTag variant
<220> FEATURE:
<221> NAME/KEY: MISC_FEATURE
<222> LOCATION: (1)..(1)
<223> OTHER INFORMATION: X is arginine or no amino acid
<220> FEATURE:
<221> NAME/KEY: MISC_FEATURE
<222> LOCATION: (1)..(2)
<223> OTHER INFORMATION: When X at position 1 is no amino acid, X at
      position 2 is no amino acid
<220> FEATURE:
<221> NAME/KEY: MISC_FEATURE
<222> LOCATION: (2)..(2)
<223> OTHER INFORMATION: X is glycine or no amino acid
<220> FEATURE:
<221> NAME/KEY: MISC_FEATURE
<222> LOCATION: (5)..(5)
<223> OTHER INFORMATION: X is histidine or threonine, preferably
      hisitidine
<220> FEATURE:
<221> NAME/KEY: MISC_FEATURE
<222> LOCATION: (11)..(11)
<223> OTHER INFORMATION: X is alanine, glycine or valine, preferably
      alanine
<220> FEATURE:
<221> NAME/KEY: MISC_FEATURE
<222> LOCATION: (14)..(14)
<223> OTHER INFORMATION: X is arginine or lysine, preferably arginine

<400> SEQUENCE: 6

Xaa Xaa Val Pro Xaa Ile Val Met Val Asp Xaa Tyr Lys Xaa Tyr Lys
1               5                   10                  15

<210> SEQ ID NO 7
<211> LENGTH: 113
<212> TYPE: PRT
<213> ORGANISM: Artificial Sequence
<220> FEATURE:
<223> OTHER INFORMATION: SpyCatcher002

<400> SEQUENCE: 7

Val Thr Thr Leu Ser Gly Leu Ser Gly Glu Gln Gly Pro Ser Gly Asp
1               5                   10                  15

Met Thr Thr Glu Glu Asp Ser Ala Thr His Ile Lys Phe Ser Lys Arg
                20                  25                  30
```

Asp Glu Asp Gly Arg Glu Leu Ala Gly Ala Thr Met Glu Leu Arg Asp
         35                  40                  45

Ser Ser Gly Lys Thr Ile Ser Thr Trp Ile Ser Asp Gly His Val Lys
 50                  55                  60

Asp Phe Tyr Leu Tyr Pro Gly Lys Tyr Thr Phe Val Glu Thr Ala Ala
 65                  70                  75                  80

Pro Asp Gly Tyr Glu Val Ala Thr Ala Ile Thr Phe Thr Val Asn Glu
                 85                  90                  95

Gln Gly Gln Val Thr Val Asn Gly Glu Ala Thr Lys Gly Asp Ala His
                100                 105                 110

Thr

<210> SEQ ID NO 8
<211> LENGTH: 113
<212> TYPE: PRT
<213> ORGANISM: Artificial Sequence
<220> FEATURE:
<223> OTHER INFORMATION: SpyCatcher

<400> SEQUENCE: 8

Val Asp Thr Leu Ser Gly Leu Ser Ser Glu Gln Gly Gln Ser Gly Asp
 1               5                   10                  15

Met Thr Ile Glu Glu Asp Ser Ala Thr His Ile Lys Phe Ser Lys Arg
                 20                  25                  30

Asp Glu Asp Gly Lys Glu Leu Ala Gly Ala Thr Met Glu Leu Arg Asp
         35                  40                  45

Ser Ser Gly Lys Thr Ile Ser Thr Trp Ile Ser Asp Gly Gln Val Lys
 50                  55                  60

Asp Phe Tyr Leu Tyr Pro Gly Lys Tyr Thr Phe Val Glu Thr Ala Ala
 65                  70                  75                  80

Pro Asp Gly Tyr Glu Val Ala Thr Ala Ile Thr Phe Thr Val Asn Glu
                 85                  90                  95

Gln Gly Gln Val Thr Val Asn Gly Lys Ala Thr Lys Gly Asp Ala His
                100                 105                 110

Ile

<210> SEQ ID NO 9
<211> LENGTH: 339
<212> TYPE: DNA
<213> ORGANISM: Artificial Sequence
<220> FEATURE:
<223> OTHER INFORMATION: Bacterial codon optimised SpyCatcher003

<400> SEQUENCE: 9
gtaaccacct tatcaggttt atcaggtgag caaggtccgt ccggtgatat gacaactgaa      60
gaagatagtg ctacccatat taaattctca aaacgtgatg aggacggccg tgagttagct     120
ggtgcaacta tggagttgcg tgattcatct ggtaaaacta ttagtacatg gatttcagat     180
ggacatgtga aggatttcta cctgtatcca ggaaaatata catttgtcga accgcagca      240 ccagacggtt atgaggtagc aactccaatt gaatttacag ttaatgagga cggtcaggtt     300
actgtagatg gtgaagcaac tgaaggtgac gctcatact                            339

<210> SEQ ID NO 10
<211> LENGTH: 339
<212> TYPE: DNA
<213> ORGANISM: Artificial Sequence
<220> FEATURE:
<223> OTHER INFORMATION: Mammallian codon optimised SpyCatcher003

<400> SEQUENCE: 10

```
gtgaccacac tgtccggact gtctggagag cagggaccat ccggcgacat gaccacagag      60
gaggattctg ccacacacat caagttcagc aagagggacg aggacggaag agagctggca     120
ggagcaacca tggagctgag ggatagctcc ggcaagacca tcagcacatg gatctccgac     180
ggccacgtga aggatttcta cctgtatccc ggcaagtaca cctttgtgga gacagcagca     240
ccagacggat atgaggtggc aaccectatc gagtttacag tgaacgagga cggacaggtg     300
accgtggatg gagaggcaac agagggcgat gcacacacc                            339
```

<210> SEQ ID NO 11
<211> LENGTH: 16
<212> TYPE: PRT
<213> ORGANISM: Artificial Sequence
<220> FEATURE:
<223> OTHER INFORMATION: SpyTag003-DA

<400> SEQUENCE: 11

```
Arg Gly Val Pro His Ile Val Met Val Ala Ala Tyr Lys Arg Tyr Lys
1               5                   10                  15
```

<210> SEQ ID NO 12
<211> LENGTH: 113
<212> TYPE: PRT
<213> ORGANISM: Artificial Sequence
<220> FEATURE:
<223> OTHER INFORMATION: SpyCatcher003 S49C

<400> SEQUENCE: 12

```
Val Thr Thr Leu Ser Gly Leu Ser Gly Glu Gln Gly Pro Ser Gly Asp
1               5                   10                  15

Met Thr Thr Glu Glu Asp Ser Ala Thr His Ile Lys Phe Ser Lys Arg
                20                  25                  30

Asp Glu Asp Gly Arg Glu Leu Ala Gly Ala Thr Met Glu Leu Arg Asp
            35                  40                  45

Cys Ser Gly Lys Thr Ile Ser Thr Trp Ile Ser Asp Gly His Val Lys
    50                  55                  60

Asp Phe Tyr Leu Tyr Pro Gly Lys Tyr Thr Phe Val Glu Thr Ala Ala
65                  70                  75                  80

Pro Asp Gly Tyr Glu Val Ala Thr Pro Ile Glu Phe Thr Val Asn Glu
                85                  90                  95

Asp Gly Gln Val Thr Val Asp Gly Glu Ala Thr Glu Gly Asp Ala His
            100                 105                 110

Thr
```

<210> SEQ ID NO 13
<211> LENGTH: 92
<212> TYPE: PRT
<213> ORGANISM: Artificial Sequence
<220> FEATURE:
<223> OTHER INFORMATION: Truncated SpyCatcher003 S28C

<400> SEQUENCE: 13

```
Asp Ser Ala Thr His Ile Lys Phe Ser Lys Arg Asp Glu Asp Gly Arg
1               5                   10                  15

Glu Leu Ala Gly Ala Thr Met Glu Leu Arg Asp Cys Ser Gly Lys Thr
                20                  25                  30

Ile Ser Thr Trp Ile Ser Asp Gly His Val Lys Asp Phe Tyr Leu Tyr
            35                  40                  45
```

```
Pro Gly Lys Tyr Thr Phe Val Glu Thr Ala Ala Pro Asp Gly Tyr Glu
    50              55                  60

Val Ala Thr Pro Ile Glu Phe Thr Val Asn Glu Asp Gly Gln Val Thr
65              70                  75                  80

Val Asp Gly Glu Ala Thr Glu Gly Asp Ala His Thr
            85                  90
```